(12) United States Patent
Lovley, II et al.

(10) Patent No.: US 10,875,596 B2
(45) Date of Patent: Dec. 29, 2020

(54) THREE-WHEELED ELECTRIC SCOOTER

(71) Applicant: BRAVO SPORTS, Santa Fe Springs, CA (US)

(72) Inventors: Jack B. Lovley, II, Lake Forest, CA (US); Joseph C. Klingl, Los Angeles, CA (US); Mark Groenhuyzen, Huntington Beach, CA (US); Kenneth Edlauer, Newbury Park, CA (US)

(73) Assignee: Bravo Sports, Santa Fe Springs, CA (US)

( * ) Notice: Subject to any disclaimer, the term of this patent is extended or adjusted under 35 U.S.C. 154(b) by 0 days.

(21) Appl. No.: 16/357,188

(22) Filed: Mar. 18, 2019

(65) Prior Publication Data
US 2020/0047838 A1     Feb. 13, 2020

Related U.S. Application Data

(63) Continuation of application No. 15/457,469, filed on Mar. 13, 2017, now abandoned, which is a
(Continued)

(51) Int. Cl.
*B62K 5/05*     (2013.01)
*B62K 3/00*     (2006.01)
(Continued)

(52) U.S. Cl.
CPC ............ *B62K 5/05* (2013.01); *B62K 3/002* (2013.01); *B62K 9/02* (2013.01); *B62J 43/00* (2020.02); *B62K 2204/00* (2013.01)

(58) Field of Classification Search
CPC . B62K 5/05; B62K 3/002; B62K 9/02; B62K 2208/00; B62K 2204/00
See application file for complete search history.

(56) References Cited

U.S. PATENT DOCUMENTS 2,241,686 A    5/1941  Ware
4,124,222 A    11/1978 Moe
(Continued)

FOREIGN PATENT DOCUMENTS

CN    2286691 Y    7/1998
CN    2376398 Y    5/2000
(Continued)

OTHER PUBLICATIONS

International Search Report and Written Opinion, PCT/US2014/070917 dated Jun. 9, 2015.
(Continued)

*Primary Examiner* — Darlene P Condra
(74) *Attorney, Agent, or Firm* — Knobbe, Martens, Olson & Bear, LLC

(57) ABSTRACT

A scooter having at least two front wheels, a rear wheel, a deck, a steering assembly that includes a handlebar and a steering tube, an electric motor configured to provide power, and a transmission configured to transfer the power provided by the electric motor. The transmission can be configured to transfer the power provided by the electric motor only to the rear wheel. In some configurations, the scooter includes a battery, a power switch, and a controller coupled to the power switch, the battery, and the electric motor. In response to receiving a signal from the power switch, the controller ramps up the voltage provided to the electric motor over an interval of time.

14 Claims, 25 Drawing Sheets

Related U.S. Application Data continuation of application No. 14/574,154, filed on Dec. 17, 2014, now Pat. No. 9,592,876.

(60) Provisional application No. 61/917,885, filed on Dec. 18, 2013.

(51) Int. Cl.
  *B62K 9/02* (2006.01)
  *B62J 43/00* (2020.01)

(56) References Cited

U.S. PATENT DOCUMENTS

| | | |
|---|---|---|
| 4,168,076 A | 9/1979 | Johnson |
| 4,315,569 A | 2/1982 | Jaeschke |
| 4,460,057 A | 7/1984 | Kohyama |
| D291,211 S | 8/1987 | Man |
| D292,221 S | 10/1987 | Mueller |
| D295,428 S | 4/1988 | Cummings |
| 4,761,014 A | 8/1988 | Huang |
| 4,799,701 A | 1/1989 | Lindau et al. |
| 4,799,702 A | 1/1989 | Wang |
| D300,756 S | 4/1989 | Cummings |
| 4,875,142 A | 10/1989 | Spector |
| D312,485 S | 11/1990 | Turner |
| 5,039,121 A | 8/1991 | Holter |
| 5,214,944 A | 6/1993 | Wolthoff |
| 5,333,477 A | 8/1994 | Davis |
| 5,376,869 A | 12/1994 | Konrad |
| D392,001 S | 3/1998 | Chen |
| 5,775,452 A | 7/1998 | Patmont |
| 5,899,474 A | 5/1999 | Grutzik |
| 5,950,498 A | 9/1999 | Gossett et al. |
| 6,139,035 A | 10/2000 | Tsai |
| D433,654 S | 11/2000 | Gorvine |
| D433,718 S | 11/2000 | McGreen |
| D437,363 S | 2/2001 | Chen |
| D441,323 S | 5/2001 | Cheng |
| 6,250,656 B1 | 6/2001 | Ibarra |
| D447,188 S | 8/2001 | Lan |
| 6,273,205 B1 | 8/2001 | Tsai |
| 6,279,929 B1 | 8/2001 | Fruechtenicht |
| D448,429 S | 9/2001 | Chen |
| 6,286,843 B1 | 9/2001 | Lin |
| D449,860 S | 10/2001 | Lin |
| 6,298,952 B1 | 10/2001 | Tsai |
| 6,299,186 B1 | 10/2001 | Kao et al. |
| D450,355 S | 11/2001 | Chan |
| 6,315,307 B1 | 11/2001 | Chen |
| D452,886 S | 1/2002 | Wang et al. |
| D454,377 S | 3/2002 | Hsu |
| D454,599 S | 3/2002 | Chen |
| D456,460 S | 4/2002 | Tseng |
| D456,461 S | 4/2002 | Koch |
| D457,574 S | 5/2002 | Chen |
| 6,382,366 B1 | 5/2002 | Chang |
| 6,431,302 B2 | 8/2002 | Patmont et al. |
| D464,002 S | 10/2002 | Ho |
| 6,481,728 B2 | 11/2002 | Chen |
| D469,348 S | 1/2003 | Demus et al. |
| D470,409 S | 2/2003 | Clarke et al. |
| D470,438 S | 2/2003 | Tateishi |
| 6,555,928 B1 | 4/2003 | Mizuno |
| D483,078 S | 12/2003 | Jung |
| D486,532 S | 2/2004 | Christianson |
| D487,908 S | 3/2004 | Mayer et al. |
| D489,771 S | 5/2004 | Laver et al. |
| D492,367 S | 6/2004 | Dennis |
| 6,752,229 B2 | 6/2004 | Ho |
| D497,397 S | 10/2004 | Sramek |
| D505,457 S | 5/2005 | Wong |
| 6,933,847 B2 | 8/2005 | Feibelman |
| D516,132 S | 2/2006 | Sramek |
| 6,997,022 B1 | 2/2006 | DeMange |
| 7,044,488 B1 | 5/2006 | Hamend |
| D528,168 S | 9/2006 | Iavarone |
| 7,100,728 B2 | 9/2006 | Huang et al. |
| D533,601 S | 12/2006 | Moreira |
| 7,178,813 B1 | 2/2007 | Bruntmyer |
| 7,267,352 B2 | 9/2007 | Ishikawa |
| 7,278,520 B2 | 10/2007 | Kim |
| D564,037 S | 3/2008 | Cramer et al. |
| 7,441,914 B2 | 10/2008 | Palmer |
| D581,991 S | 12/2008 | Armand et al. |
| 7,597,333 B2 | 10/2009 | Stillinger |
| 7,819,245 B2 | 10/2010 | Singh et al. |
| 7,886,901 B1 | 2/2011 | Singh et al. |
| 7,937,975 B2 | 5/2011 | Kolton et al. |
| D648,402 S | 11/2011 | Wang |
| D651,659 S | 1/2012 | Scolari et al. |
| D654,962 S | 2/2012 | Scolari et al. |
| D654,965 S | 2/2012 | Herlitz et al. |
| 8,162,090 B2 | 4/2012 | Atherton et al. |
| 8,167,074 B1 | 5/2012 | Tsiyoni |
| D672,400 S | 12/2012 | Pizzi |
| 8,322,735 B2 | 12/2012 | Steinbach |
| 8,500,147 B2 | 8/2013 | Johnson |
| D693,414 S | 11/2013 | Hadley et al. |
| 8,613,458 B2 | 12/2013 | Ghisolfi et al. |
| D698,868 S | 2/2014 | Chan |
| 8,662,508 B2 | 3/2014 | Grossman |
| 8,696,000 B1 | 4/2014 | Chen |
| D710,949 S | 8/2014 | Huang |
| 8,813,892 B2 | 8/2014 | Hadley |
| D712,980 S | 9/2014 | Lovley, II et al. |
| D714,396 S | 9/2014 | Talios et al. |
| 8,864,152 B1 | 10/2014 | Danze |
| D727,833 S | 4/2015 | Talios et al. |
| D728,033 S | 4/2015 | O'Connell |
| 9,045,189 B2 | 6/2015 | Lovley, II et al. |
| 9,051,017 B2 | 6/2015 | Scolari et al. |
| D736,324 S | 8/2015 | Lu |
| D736,861 S | 8/2015 | Eckert et al. |
| D738,435 S | 9/2015 | O'Connell |
| 9,168,965 B2 | 10/2015 | Lovley, II et al. |
| 9,193,332 B2 | 11/2015 | Gillan et al. |
| D750,180 S | 2/2016 | Edlauer |
| 9,260,157 B2 | 2/2016 | Chu et al. |
| 9,272,739 B2 | 3/2016 | Zaid et al. |
| D755,305 S | 5/2016 | Edlauer et al. |
| D756,464 S | 5/2016 | Edlauer |
| D777,261 S | 1/2017 | Desberg |
| 9,533,734 B2 | 1/2017 | Olsommer et al. |
| D779,594 S | 2/2017 | Lovley, II et al. |
| 9,592,876 B2 | 3/2017 | Lovley, II et al. |
| D795,354 S | 8/2017 | Desberg |
| D806,176 S | 12/2017 | Peng |
| 9,994,278 B2 | 6/2018 | Lovley, II et al. |
| 10,099,745 B2 | 10/2018 | Hadley et al. |
| 10,124,851 B2 | 11/2018 | Lovley, II et al. |
| D839,359 S | 1/2019 | Hadley |
| 10,189,533 B2 | 1/2019 | Lovley, II et al. |
| 2001/0011202 A1 | 8/2001 | Yamawaki |
| 2001/0017450 A1 | 8/2001 | Chuang |
| 2002/0070519 A1 | 6/2002 | Rappaport |
| 2002/0105157 A1 | 8/2002 | Chen |
| 2002/0117825 A1 | 8/2002 | Ho |
| 2002/0170763 A1 | 11/2002 | Townsend |
| 2003/0127822 A1 | 7/2003 | Fleck et al. |
| 2004/0012166 A1 | 1/2004 | Reginato |
| 2004/0026144 A1 | 2/2004 | Lan |
| 2004/0050603 A1 | 3/2004 | Jaeger |
| 2004/0079571 A1 | 4/2004 | Laver et al. |
| 2005/0092538 A1 | 5/2005 | Baldwin et al. |
| 2005/0230930 A1 | 10/2005 | Chung |
| 2006/0266570 A1 | 11/2006 | Roth et al. |
| 2007/0187164 A1 | 8/2007 | Yang |
| 2008/0203691 A1 | 8/2008 | Hsu |
| 2009/0160150 A1 | 6/2009 | Johnson |
| 2009/0200768 A1 | 8/2009 | Armand et al. |
| 2010/0013183 A1 | 1/2010 | He |
| 2010/0133778 A1 | 6/2010 | Munksoe |
| 2011/0006500 A1 | 1/2011 | Rush |
| 2011/0024217 A1 | 2/2011 | Sluijter et al. |

(56) References Cited

U.S. PATENT DOCUMENTS

| | | |
|---|---|---|
| 2011/0031711 A1 | 2/2011 | Grossman |
| 2011/0056177 A1 | 3/2011 | Goto |
| 2011/0068554 A1 | 3/2011 | Armand et al. |
| 2011/0200385 A1 | 8/2011 | Broussard |
| 2011/0240391 A1 | 10/2011 | Bonneville |
| 2012/0018967 A1 | 1/2012 | Chen |
| 2012/0048636 A1 | 3/2012 | Huang |
| 2012/0181765 A1 | 7/2012 | Hill |
| 2012/0228845 A1 | 9/2012 | Wegener |
| 2012/0234446 A1 | 9/2012 | Brown |
| 2013/0033883 A1 | 2/2013 | Ward et al. |
| 2013/0256048 A1 | 10/2013 | Chen |
| 2013/0269473 A1 | 10/2013 | Ierfone |
| 2014/0015656 A1 | 1/2014 | Shimizu et al. |
| 2014/0042717 A1 | 2/2014 | Chan |
| 2014/0175768 A1 | 6/2014 | Talavasek et al. |
| 2014/0238758 A1 | 8/2014 | Barth |
| 2015/0166138 A1 | 6/2015 | Lovley, II et al. |
| 2016/0107517 A1 | 4/2016 | Larray et al. |
| 2016/0256767 A1 | 9/2016 | Cerboneschi |
| 2016/0311322 A1 | 10/2016 | Lagant et al. |
| 2016/0347408 A1 | 12/2016 | Guida |
| 2017/0190335 A1 | 7/2017 | Gillett |
| 2017/0369117 A1 | 12/2017 | Lovley, II et al. |
| 2018/0050589 A1 | 2/2018 | Yu et al. |
| 2019/0058982 A1 | 2/2019 | Lee |
| 2019/0135367 A1 | 5/2019 | Lovley, II et al. |
| 2019/0143232 A1 | 5/2019 | Lovley, II et al. |
| 2019/0315426 A1 | 10/2019 | Lovley, II et al. |
| 2019/0389529 A1 | 12/2019 | Lovley, II et al. |

FOREIGN PATENT DOCUMENTS

| | | |
|---|---|---|
| CN | 2419148 Y | 2/2001 |
| CN | 2493513 | 5/2002 |
| CN | 301291742 S | 7/2010 |
| CN | 101965289 | 2/2011 |
| CN | 102050182 | 5/2011 |
| CN | 202863656 | 4/2013 |
| CN | 203306176 | 11/2013 |
| CN | 203473137 U | 3/2014 |
| CN | 203544249 U | 4/2014 |
| DE | 4309170 | 9/1994 |
| EP | 0 570 653 | 11/1996 |
| EP | 1 982 881 | 10/2008 |
| EP | 2 127 965 | 12/2009 |
| EP | 2 762 395 | 8/2014 |
| FR | 2 555 908 | 6/1985 |
| GB | 2 466 241 | 6/2010 |
| TW | 461413 | 10/2001 |
| TW | 481157 | 3/2002 |
| WO | WO 2004/048168 | 6/2004 |
| WO | WO 2015/095368 | 6/2015 |

OTHER PUBLICATIONS

U.S. Appl. No. 14/043,748 (U.S. Pat. No. 9,168,965), filed Oct. 1, 2013, Electric Scooter Assemblies.

U.S. Appl. No. 14/920,835 (U.S. Pat. No. 10,124,851), filed Oct. 22, 2015, Electric Scooter Assemblies.

U.S. Appl. No. 16/186,256, filed Nov. 9, 2018, Electric Scooter Assemblies.

U.S. Appl. No. 14/043,625 (U.S. Pat. No. 9,045,189), Oct. 1, 2013, Scooter Assemblies.

U.S. Appl. No. 14/723,892 (U.S. Pat. No. 9,994,278), May 28, 2015, Scooter Assemblies.

U.S. Appl. No. 16/002,937, filed Jun. 7, 2018, Scooter Assemblies.

U.S. Appl. No. 16/794,836, filed Feb. 19, 2020, Scooter Assemblies.

U.S. Appl. No. 14/033,108 (U.S. Pat. No. 9,193,332), filed Sep. 20, 2013, Wheel Cover for Wheeled Vehicles.

U.S. Appl. No. 14/948,089, filed Nov. 20, 2015, Wheel Cover for Wheeled Vehicles.

U.S. Appl. No. 29/455,239 (U.S. Pat. No. D712,980), filed May 17, 2013 Scooter Connector Tubing.

U.S. Appl. No. 29/501,638 (U.S. Pat. No. D779594), filed Sep. 5, 2014, Scooter Connector Tubing.

U.S. Appl. No. 14/574,154 (U.S. Pat. No. 9,592,876), filed Dec. 17, 2014, Three-Wheeled Electric Scooter.

U.S. Appl. No. 15/457,469, filed Mar. 13, 2017, Three-Wheeled Electric Scooter.

U.S. Appl. No. 16/357,188, filed Mar. 18, 2019, Three-Wheeled Electric Scooter.

U.S. Appl. No. 29/487,964, filed Apr. 14, 2014, Three-Wheeled Scooter.

U.S. Appl. No. 14/574,125 (U.S. Pat. No. 10,189,533), filed Dec. 17, 2014, Electric Scooter.

U.S. Appl. No. 16/257,836, filed Jan. 25, 2019, Electric Scooter.

U.S. Appl. No. 29/477,011 (U.S. Pat. No. D750,180), filed Dec. 18, 2013, Scooter.

U.S. Appl. No. 29/513,250, (U.S. Pat. No. D756,464), filed Dec. 29, 2014, Scooter.

U.S. Appl. No. 29/544,347, filed Nov. 2, 2015, Scooter.

U.S. Appl. No. 29/544,349, filed Nov. 2, 2015, Scooter.

U.S. Appl. No. 29/667,021, filed Oct. 17, 2018, Scooter.

U.S. Appl. No. 29/544,351, filed Nov. 2, 2015, Scooter.

U.S. Appl. No. 29/618,714, filed Sep. 22, 2017, Scooter.

U.S. Appl. No. 29/578,840, filed Sep. 25, 2016, Scooter.

U.S. Appl. No. 29/676,545, filed Jan. 11, 2019, Scooter.

U.S. Appl. No. 16/007,121, filed Jun. 13, 2018, Drag-Reducing Systems and Charging Systems for Electric Scooter.

U.S. Appl. No. 29/622,685, filed Oct. 18, 2017, Adjustable Roller Skate.

PCT/US2019/066972, filed Dec. 17, 2019, Hanging Device for Skateboards and Other Items.

THREE-WHEELED ELECTRIC SCOOTER

CROSS REFERENCE AND INCORPORATION BY REFERENCE TO RELATED APPLICATIONS

This application is a continuation of U.S. patent application Ser. No. 15/457,469, filed Mar. 13, 2017, which is a continuation of U.S. patent application Ser. No. 14/574,154, filed Dec. 17, 2014, which claims priority to U.S. Provisional Patent Application No. 61/917,885, filed Dec. 18, 2013. The entire contents of all of the aforementioned applications are incorporated herein by reference in their entireties.

BACKGROUND

Field

The invention disclosed herein relates generally to electric scooter assemblies, including children's three-wheeled electric scooter assemblies.

Description of the Related Art

Many types of scooters exist, including three-wheeled scooters and electric scooters. Three-wheeled scooters can be advantageous for young children to avoid or lessen the need to balance the scooter. Providing powered movement for a vehicle, such as scooters and other vehicles powered by an electric motor, can also be used to improve the user experience for children. A need exists for improved three-wheeled electric scooters or at least new designs to provide the consumer with a useful choice.

SUMMARY

The systems, methods and devices described herein have innovative aspects, no single one of which is indispensable or solely responsible for their desirable attributes. Without limiting the scope of the claims, some of the advantageous features will now be summarized.

In an embodiment, a scooter can generally comprise at least two front wheels, a rear wheel, a deck, a steering assembly that includes a handlebar and a steering tube, an electric motor configured to provide power, and a transmission configured to transfer the power provided by the electric motor. Preferably, the deck is configured to support the weight of at least a child. In other embodiments, the deck can be configured to support the weight of an adolescent or adult. The at least two front wheels can be coupled to the steering assembly to assist in steering. The transmission can be configured to transfer the power provided by the electric motor only to the rear wheel.

In some embodiments, the rear wheel and the electric motor can both be located on a same side relative to the transmission. In other embodiments, the rear wheel can be located on a first side relative to the transmission, and the electric motor can be located on a second side relative to the transmission, wherein the first side and second side are different.

The steering assembly can further include a power switch coupled to the handlebar. The power switch can be used to turn on the electric motor. A control wire coupled to the power switch and the electric motor can be located at least partially within an interior of the steering tube.

In some configurations, a scooter includes at least two front wheels, a rear wheel, a steering assembly comprising a handlebar and a steering tube coupled to the at least two front wheels, a deck configured to support the weight of a child, an electric motor configured to provide power, and a transmission configured to transfer power provided by the electric motor to the rear wheel.

In some configurations, the rear wheel and electric motor are both located on a same side of the transmission.

In some configurations, the electric motor is located approximately in line with the rear wheel in a lateral direction of the scooter.

In some configurations, the scooter includes a battery. The electric motor can be positioned between the battery and the rear wheel in a lengthwise direction of the scooter.

In some configurations, the battery is surrounded by frame members on front, rear, right and left sides of the battery.

In some configurations, a transmission casing at least partially encloses one or more transmission gears, wherein the electric motor is coupled to and supported by the casing.

In some configurations, the transmission comprises a drive element for driving the rear wheel, wherein the electric motor is at a first end of the transmission casing and the drive element is at a second end of the transmission casing in a lengthwise direction of the scooter.

In some configurations, a power switch is coupled to the handlebar and a control wire coupled to the power switch. The control wire is at least partially within an interior of the steering tube.

In some configurations, the scooter includes a battery, a power switch, and a controller coupled to the power switch, the battery, and the electric motor. In response to receiving an on-signal from the power switch, the controller is configured to ramp up the voltage provided to the electric motor over an interval of time.

In some configurations, the interval of time is at least one second.

In some configurations, the interval of time is about two seconds.

In some configurations, the power switch is a binary switch.

In some configurations, the controller is configured to, upon actuation of the power switch, initially limit the voltage provided by the electric motor to the motor to a predetermined fraction of the full power for a pre-specified amount of time.

In some configurations, a method of controlling an electric scooter includes receiving an on-signal from a user control, ramping up a voltage applied to an electric motor over an interval of time in response to the on-signal, and using power from the electric motor to drive a wheel of the scooter.

In some configurations, the interval of time is at least one second.

In some configurations, the interval of time is about two seconds.

In some configurations, the on-signal is a binary signal.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
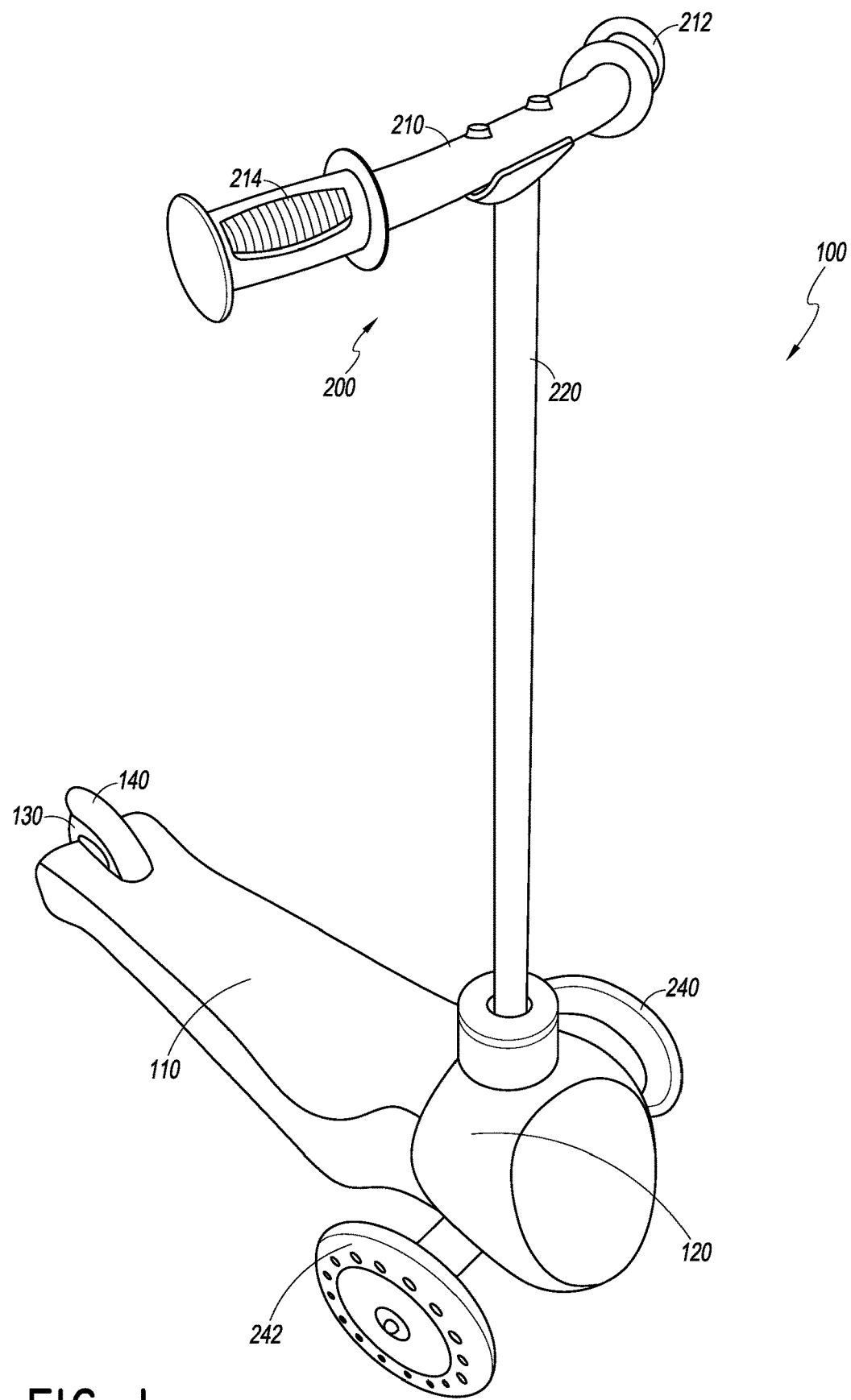
FIG. 1 is a perspective view of an embodiment of a scooter assembly.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
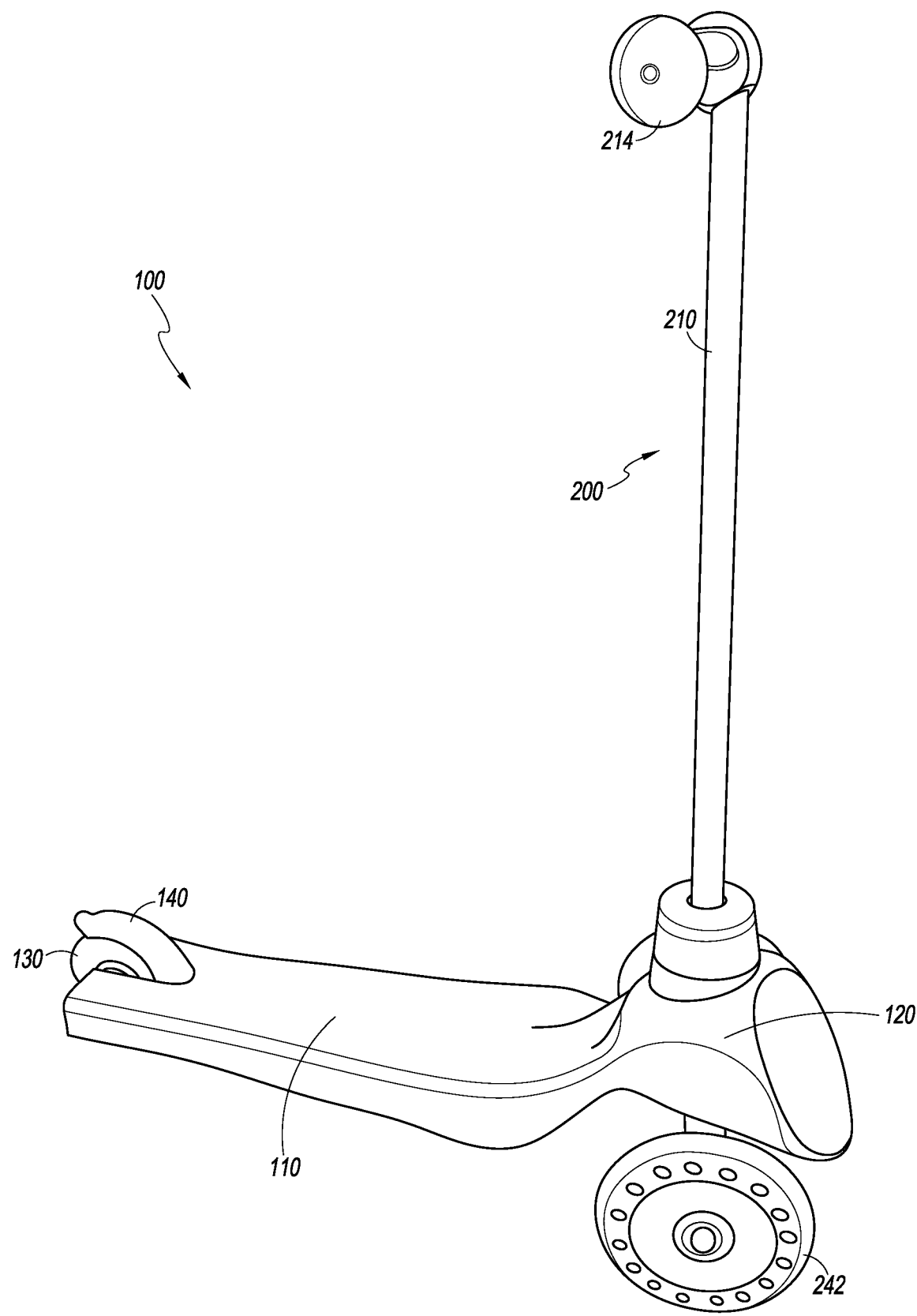
FIG. 2 is a right side elevational view of an embodiment of a scooter assembly.
Figure 3:
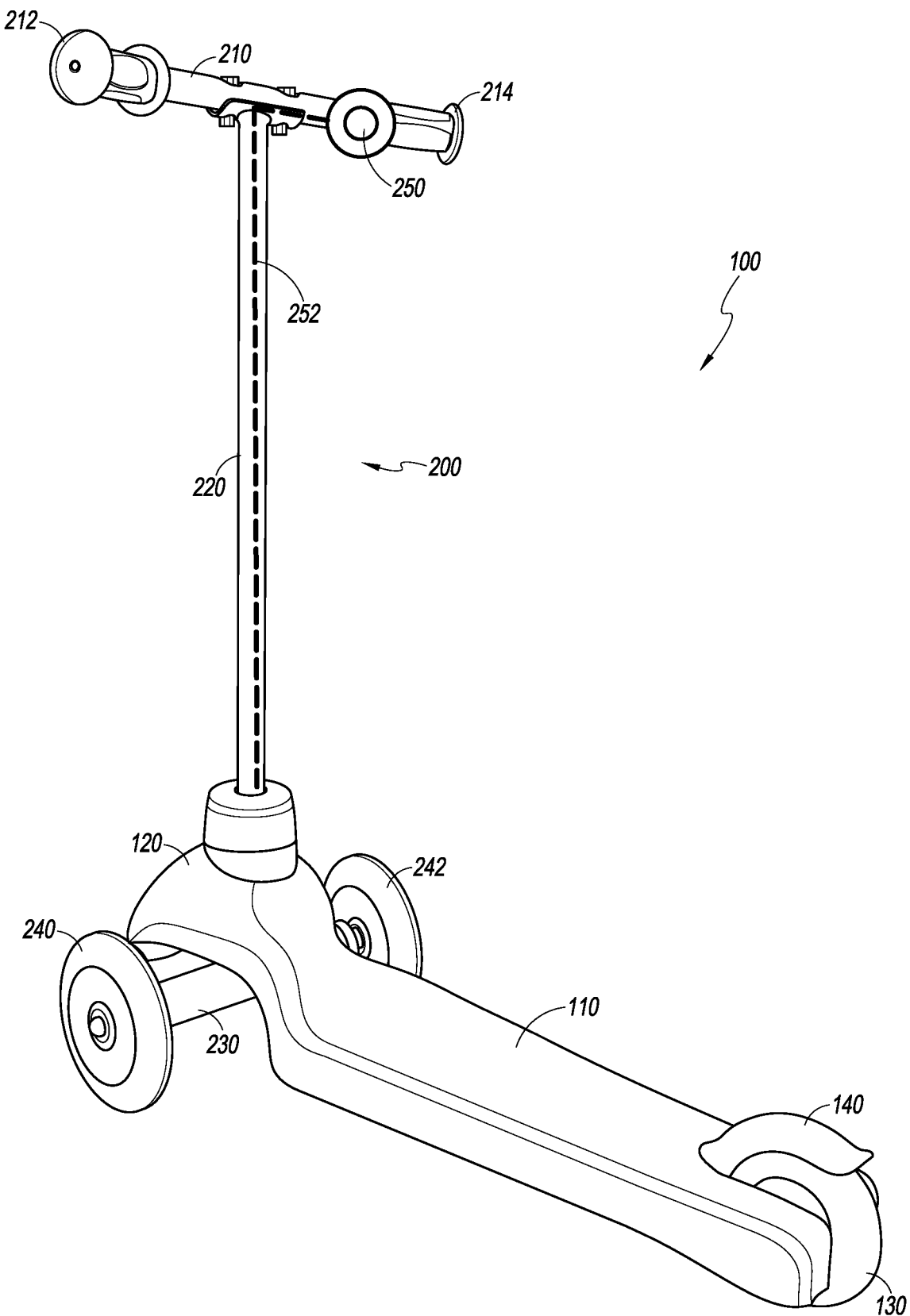
FIG. 3 is a perspective view of an embodiment of a scooter assembly.

FIGS. 1-3 illustrate an embodiment of a scooter 100. The scooter 100 can generally comprise a deck 110, a neck portion 120, a rear wheel 130, a foot brake 140, and a steering assembly 200. The deck 110 is a component of the scooter 100 on which a rider can stand during use. For example, the deck 110 can provide a relatively flat upper surface that is configured to support the weight of at least a child. In other embodiments, the deck 110 can be configured to support the weight of an adolescent or adult. In some embodiments, the scooter 100 can include an electric motor and a transmission.

The neck portion 120 can be joined to the deck 110 at or near a front end of the deck 110. The neck portion 120 can serve to couple the deck 110 and the steering assembly 200. In some embodiments, the neck portion 120 can be integrally formed with the deck 110 such that the deck 110 and neck portion 120 are a single machined or molded component or a unitary structure formed by any suitable process. The scooter 100 can also include a housing or cowling that encloses a portion or entirety of the steering assembly 200 and, in some configurations, is positioned in front of the deck 110. The housing can have a portion that extends forward of the front wheels 240, 242.

The steering assembly 200 generally can comprise a handlebar 210, steering tube 220, rotating axle assembly 230, left front wheel 240, and right front wheel 242. The steering tube 220 can be coupled to and extend through the neck portion 120. The deck 110, neck portion 120, and steering assembly 200 can be formed from various materials, including any combination of metals, plastic, carbon fiber, and/or other materials that impart sufficient structural strength to support the weight of at least a child. At a top portion of the steering tube 220 a handlebar 210 can be attached. The handlebar 210 can comprise a left handle 212 and a right handle 214 for the rider to grip and steer the scooter 100. Turning the handlebar 210 can cause the steering tube 220 to turn the axle 230 about a steering axis of the scooter 100, thereby turning the front left and right wheels 240 and 242 to steer the scooter 100.

In addition, the handlebar 210 can comprise a user control, such as a power switch 250, as illustrated in FIG. 3. A user can activate the power switch 250 to turn on or otherwise activate an electric motor. The power switch 250 may be coupled to a controller (e.g., the controller shown in FIG. 21), which may control the electric motor that drives a wheel 130, 240, 242 of the scooter 100. For example, the controller may control a voltage delivered to the electric motor from a power source, such as a battery. For example, upon a person pressing the power switch 250, the controller may be configured to ramp up the voltage in a smooth sustained manner, toward or to a maximum voltage corresponding to a maximum power output or speed, such that the acceleration of the scooter 100 is controlled, progressive or relatively smooth, or at least is not jerky. In particular, the controller may be configured to provide a controlled increase in speed toward or to a maximum speed, in a way that would be unlikely to result in a sudden jerk.

The power switch 250 may comprise a binary control, such as a spring-return on/off button. Such an arrangement is well-suited for use in an application for young children because the user can simply indicate a desire to move by pushing the button 250 and the controller can regulate an acceleration of the scooter 100 without requiring the user to regulate the acceleration, such as would be the case with the use of a variable control (e.g., a twist throttle). In alternative embodiments, the power switch 250 comprises a variable control, such as a variable throttle.

A control wire 252 can electrically couple the power switch 250 and the electric motor. In some embodiments, the control wire 252 can be partially or completely hidden from view. For example, as indicated in FIG. 3, the control wire 252 can be placed within an interior portion of the steering tube 220 so that no portion of the control wire 252 is externally visible, at least when the scooter 100 is resting on a generally flat surface in a normal use condition. In other embodiments, at least a portion of the control wire 252 is located within an interior portion of the steering tube 220.

The foot brake 140 can be located in proximity to a rear portion of the deck 110. In some embodiments, the foot brake 140 can comprise plastic. In other embodiments, the foot brake 140 can comprise metals, carbon fiber, or any other suitable material. The foot brake 140 can be configured to pivot about an axis. By pivoting downward, the foot brake 140 can provide a braking pressure to the rear wheel 130. The foot brake 140 can be configured to return to its natural un-pivoted position after a user has finished applying braking pressure, such as under the influence of a biasing force from a biasing member or arrangement (e.g., a spring).

Figure 4:
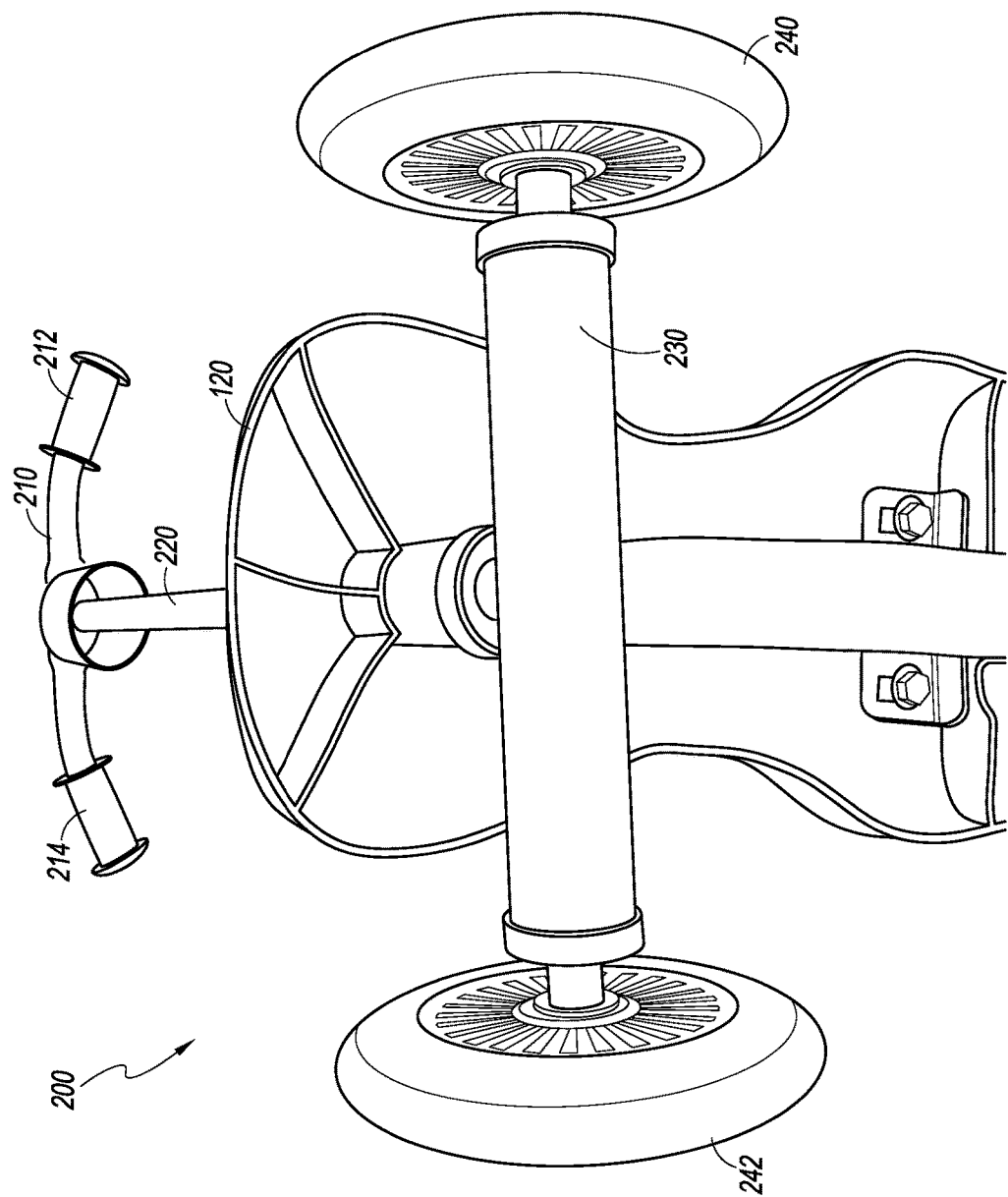
FIG. 4 is a perspective view of an embodiment of a steering column of a scooter assembly.

FIG. 4 illustrates an embodiment of a steering assembly 200 of a scooter assembly, such as the scooter 100 of FIGS. 1-3. For example, a steering assembly 200 can comprise a handlebar 210, steering tube 220, rotating axle assembly 230, left front wheel 240, and right front wheel 242. The steering tube 220 can be coupled to the neck portion 120. In addition, the steering tube 220 can extend through the neck portion 120 to the rotating axle assembly 230. The rotating axle assembly 230 can be coupled to the front left and right wheels 240 and 242. At or near a top portion of the steering tube 220 a handlebar 210 can be attached. The handlebar 210 can comprise a left handle 212 and a right handle 214 for the rider to grip and steer the scooter. Turning the handlebar 210 can cause the steering tube 220 to turn the front left and right wheels 240 and 242. In preferred embodiments, power from an electric motor is not supplied to the front left and right wheels 240 and 242, as front left and right wheels 240 and 242 are primarily used for steering.

FIGS. 5-8 illustrate an embodiment of an electric motor and transmission system that can be positioned underneath the deck 110 or in other suitable locations of a scooter assembly 100. The electric motor and transmission system can generally comprise an electric motor 400 and a solid-gear transmission 300. For example, a solid-gear transmission 300 can comprise a first gear 310, a second gear 320, and a third gear 330, which can be spur gears in some configurations. The solid-gear transmission 300 can transfer mechanical power output from the electric motor 400 to the rear wheel of a scooter assembly. The rear wheel 130 of the scooter assembly can be positioned about a rear-wheel casing 132, which serves as a drive element for the rear wheel 130. That is, the casing 132 can be the final drive between the transmission 300 and the rear wheel 130.

Figure 5:
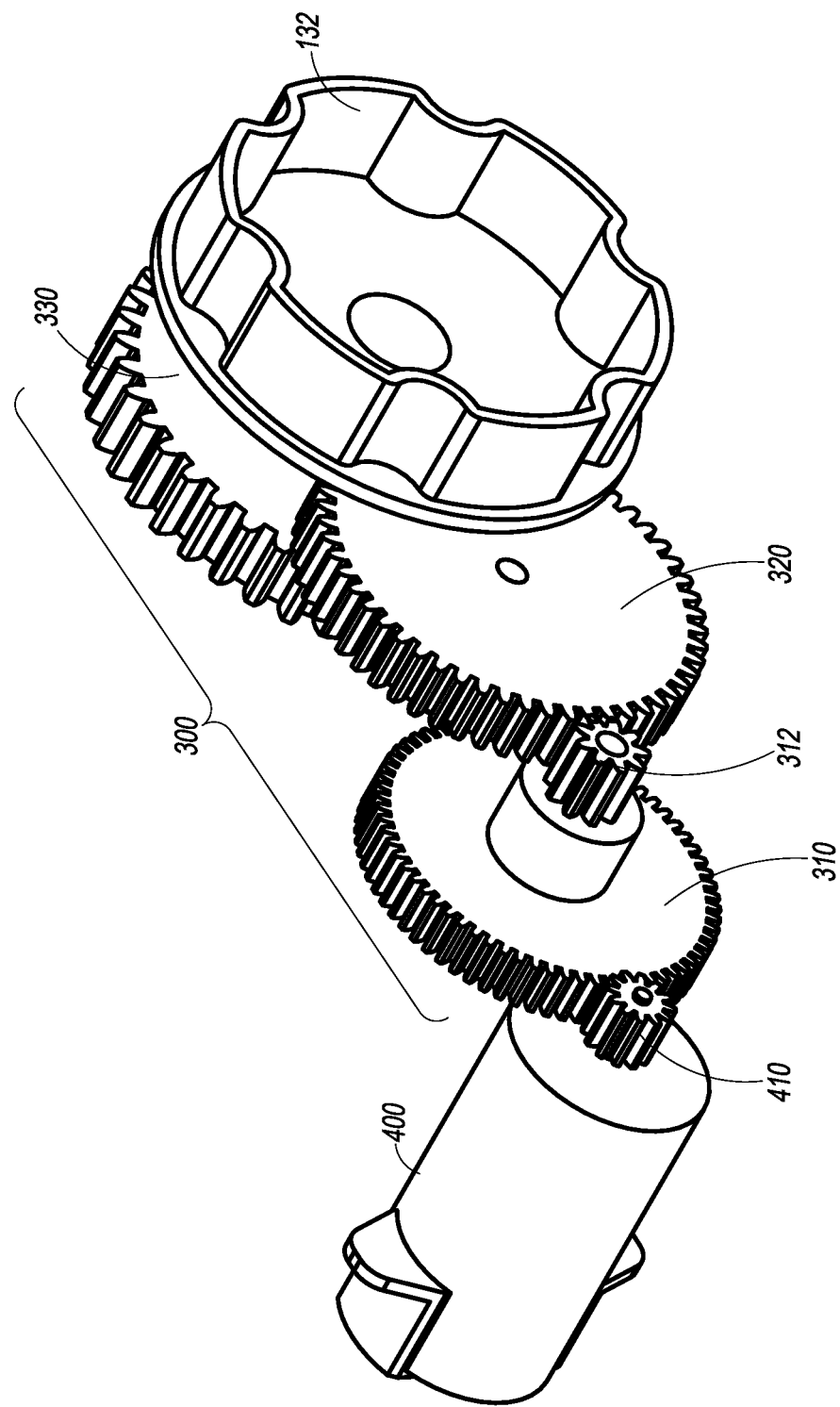
FIG. 5 is a perspective view of an embodiment of an electric motor and transmission system for a scooter assembly.
Figure 6:
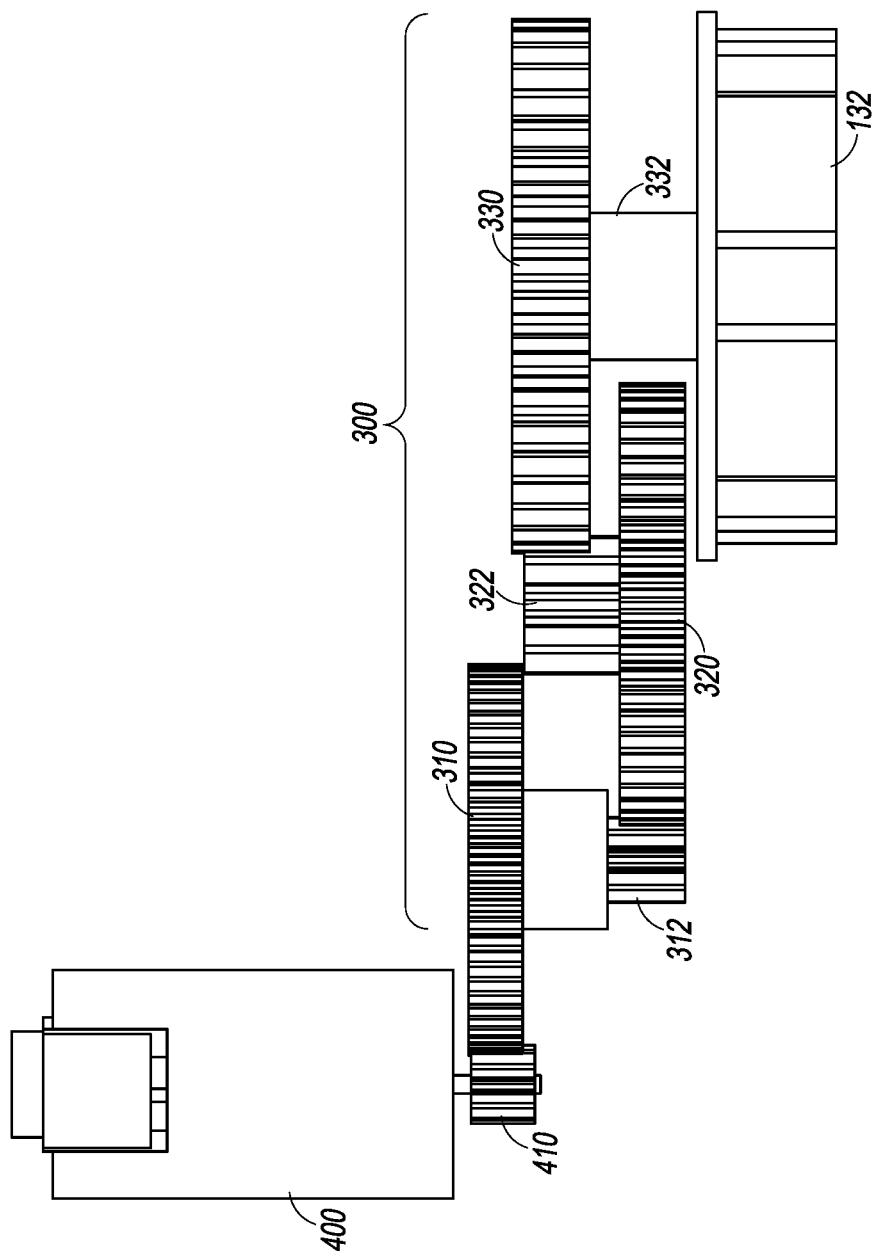
FIG. 6 is a top plan view of an embodiment of an electric motor and transmission system for a scooter assembly.
Figure 7:
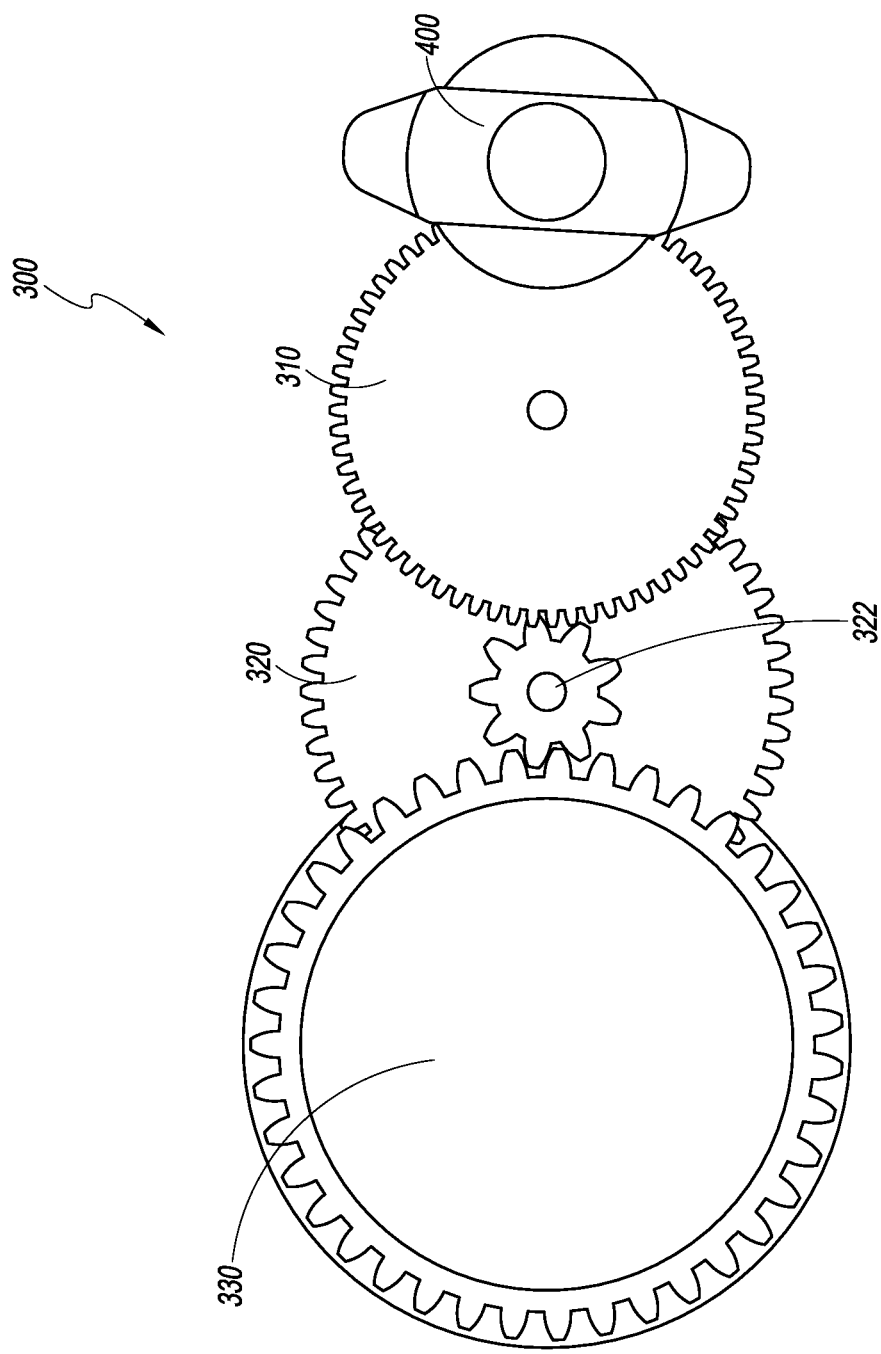
FIG. 7 is a right side elevational view of an embodiment of an electric motor and transmission system for a scooter assembly.
Figure 8:
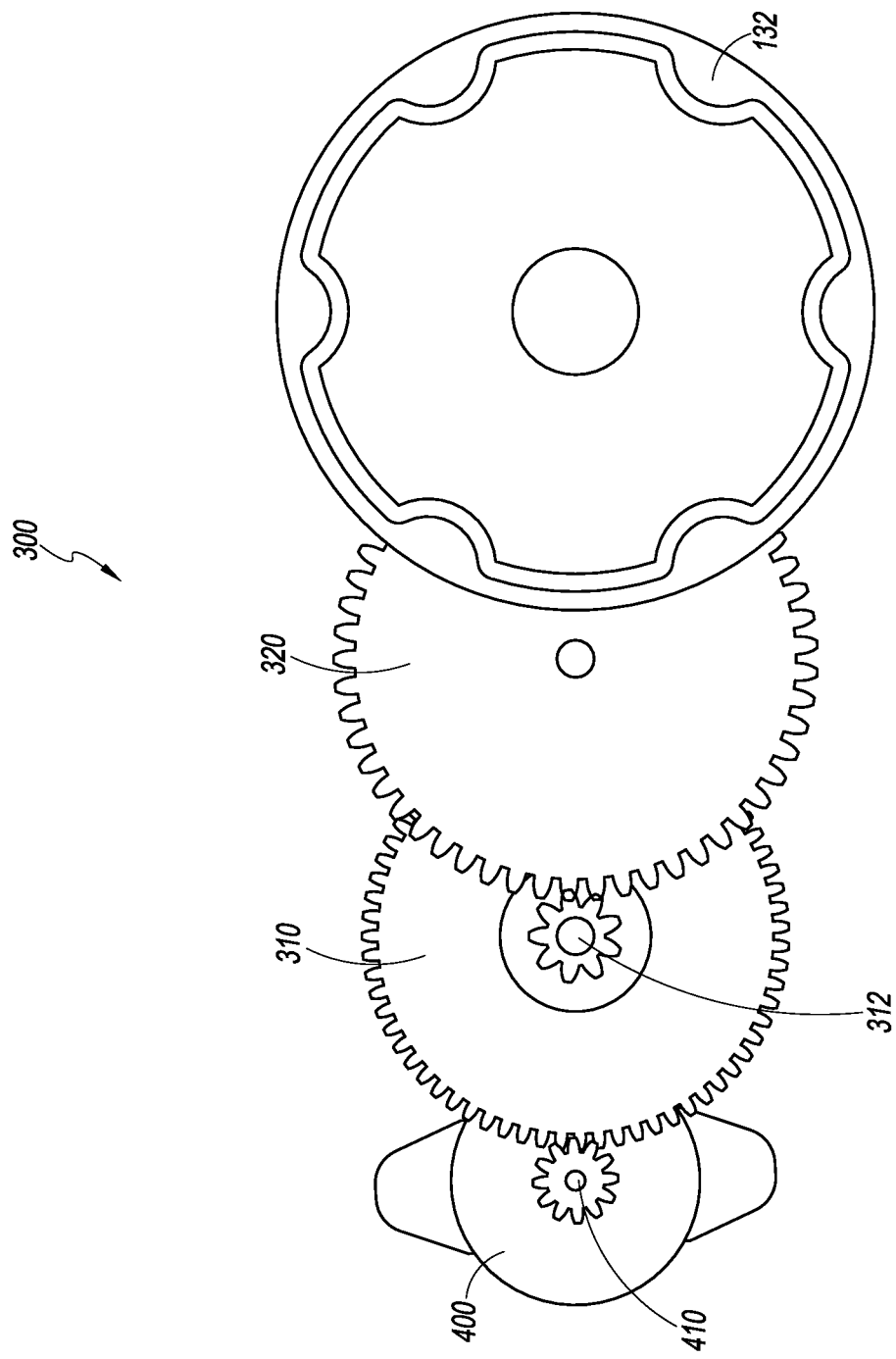
FIG. 8 is a left side elevational view of an embodiment of an electric motor and transmission system for a scooter assembly.

In some embodiments, the electric motor can be located on a first side of or relative to the transmission. For example, as illustrated in FIG. 5, if the electric motor 400 is oriented towards the front of a scooter assembly, the electric motor 400 can be located on a right side of the transmission 300. The body of the motor 400 (excluding the drive shaft to which the gear 410 is coupled) is located to the right of at least a centerline of the transmission, which can be defined as a line equidistant from outermost lateral points of the transmission 300. In some configurations, the outermost lateral points of the transmission 300 fall within opposed lateral planes containing outwardly-facing side surfaces of the gears on each side of the transmission 300. In some configurations, the body of the motor 400 is located to one side of the lateral plane on the same side of the transmission 300.

The rear wheel can be located on a second side relative to the transmission 300, different than the first side. For example, if the electric motor 400 is oriented towards the front of a scooter assembly (and on the right side of the transmission 300), the rear-wheel casing 132 can be located on a left side relative to the transmission 300. The relative positioning of the electric motor 400 and rear wheel relative to the transmission can be used to improve the weight distribution of the scooter assembly, which can result in a smoother and more stable ride. In other embodiments, the rear wheel and the electric motor can both be located on a same side relative to the transmission 300. As described, sides of the transmission 300 can be relative to a central line (e.g., right or left of center) of the transmission 300 or relative to outer planes defined by the side surfaces of the outermost gears of the transmission 300.

In some embodiments, the electric motor 400 provides mechanical power to an electric motor shaft 410. For example, when mechanical power is provided to the electric motor shaft 410, it can rotate. The electric motor shaft 410 can comprise teeth configured to engage teeth of the first gear 310. For example, when the electric motor shaft 410 rotates, rotational energy can be transferred to the first gear 310.

The first gear 310 can impart its rotational energy to a first gear shaft 312. For example, when the first gear 310 rotates, the first gear shaft 312 can rotate at the same rotational speed. The first gear shaft 312 can comprise teeth configured to engage teeth of the second gear 320. For example, when the first gear shaft 312 rotates, rotational energy can be transferred to the second gear 320.

The second gear 320 can impart its rotational energy to a second gear shaft 322. For example, when the second gear 320 rotates, the second gear shaft 322 can rotate at the same rotational speed. The second gear shaft 322 can comprise teeth configured to engage teeth of the third gear 330. For example, when the second gear shaft 322 rotates, rotational energy can be transferred to the third gear 330.

The third gear 330 can impart its rotational energy to a third gear shaft 332. For example, when the third gear 330 rotates, the third gear shaft 332 can rotate at the same rotational speed. The third gear shaft 332 can be configured to engage a rear wheel. For example, when the third gear shaft 332 rotates, rotational energy can be transferred the rear wheel.

As described above, the transmission 300 can transfer rotational mechanical energy provided by the electric motor 400 to the rear wheel of the scooter assembly. By comprising solid gears 310, 320, and 330, the transmission 300 can transfer the mechanical energy without using belts and/or chains. In some embodiments, the transmission 300 transfers the mechanical energy provided by the electric motor 400 only to the rear wheel of the scooter assembly, not directly to the front left and right wheels.

Figure 9:
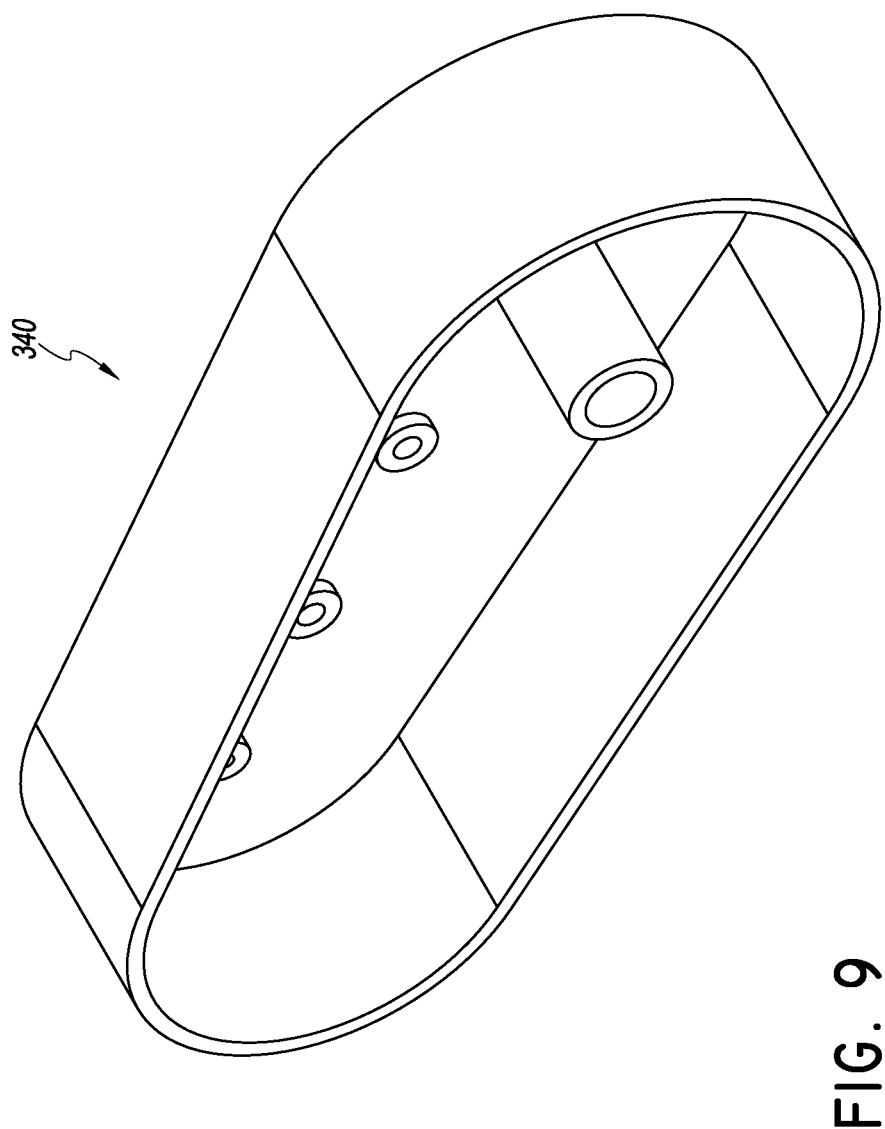
FIG. 9 is a perspective view of an embodiment of a casing for a transmission system for a scooter assembly.

FIG. 9 illustrates an embodiment of a casing 340 for a transmission system for a scooter assembly. The casing 340 can include a side wall, a perimeter wall and a plurality of bosses or supports that support gears of the transmission and/or a rear wheel of the scooter. The bosses or supports can be unitarily formed with the casing 340. In some configurations, the casing 340 can be configured to house the transmission system 300 illustrated in FIGS. 5-8.

Figure 10:
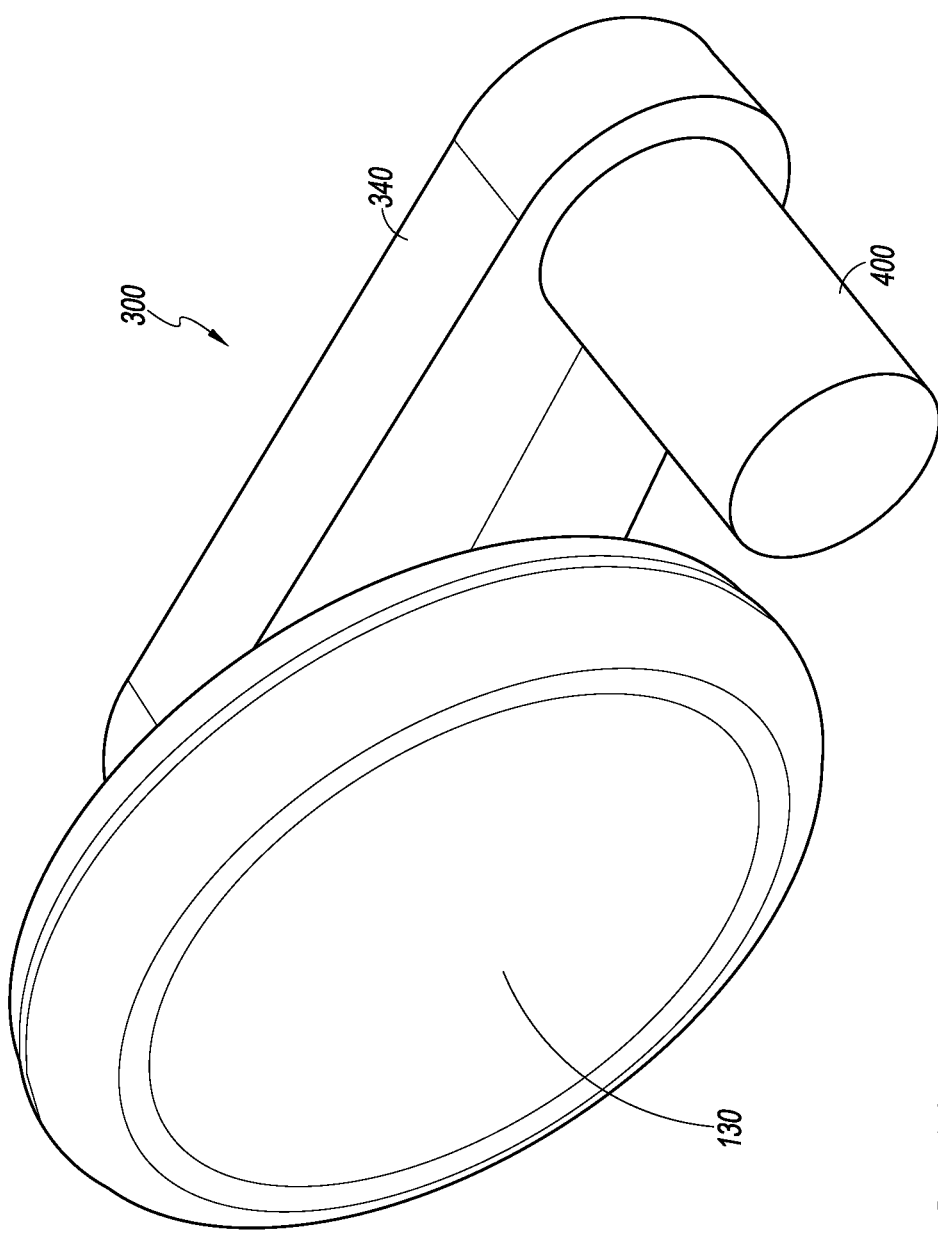
FIG. 10 is a perspective view of an embodiment of an electric motor and transmission system for a scooter assembly.
Figure 11:
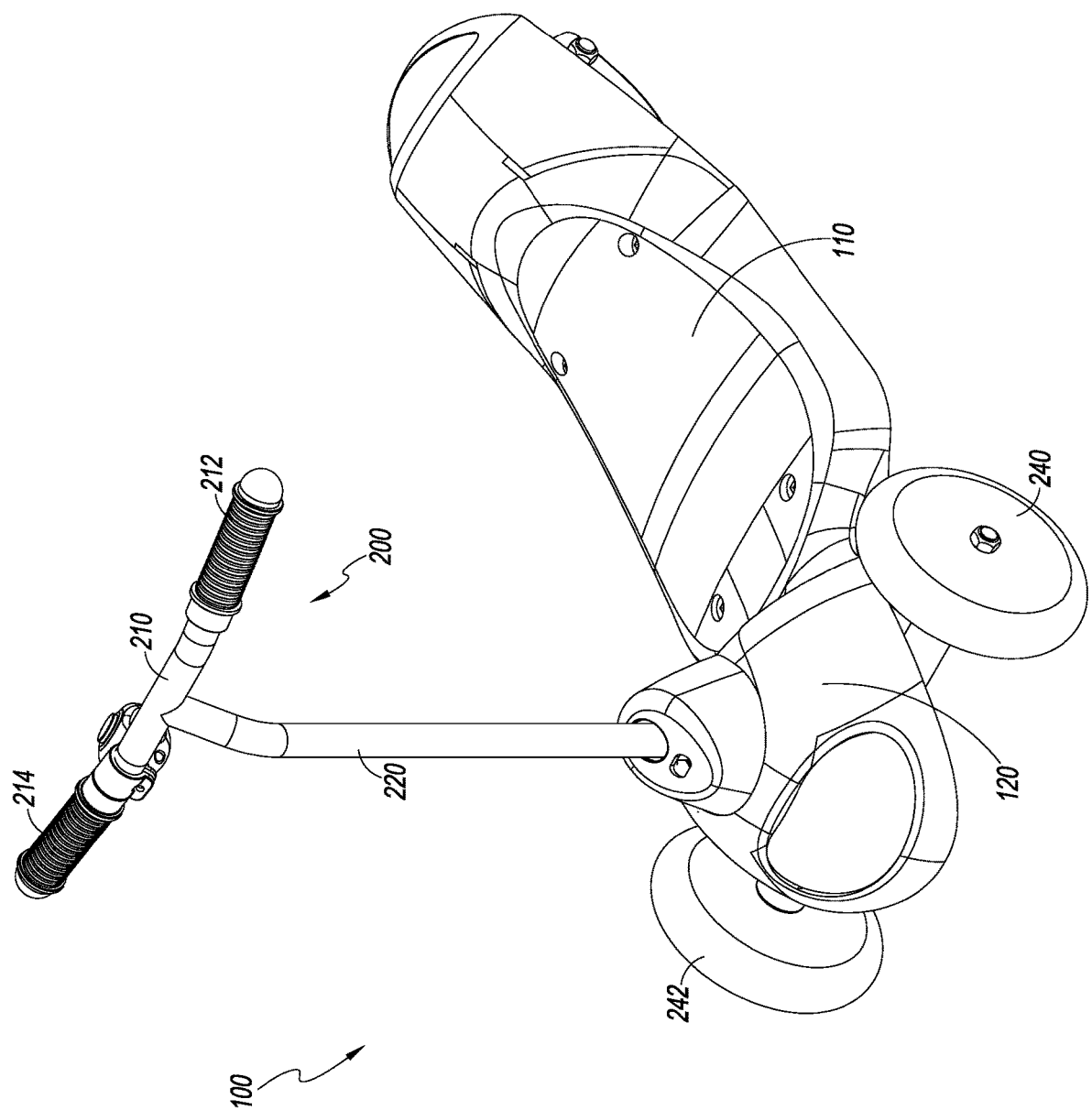
FIG. 11 is a perspective view of an embodiment of a scooter assembly.
Figure 12:
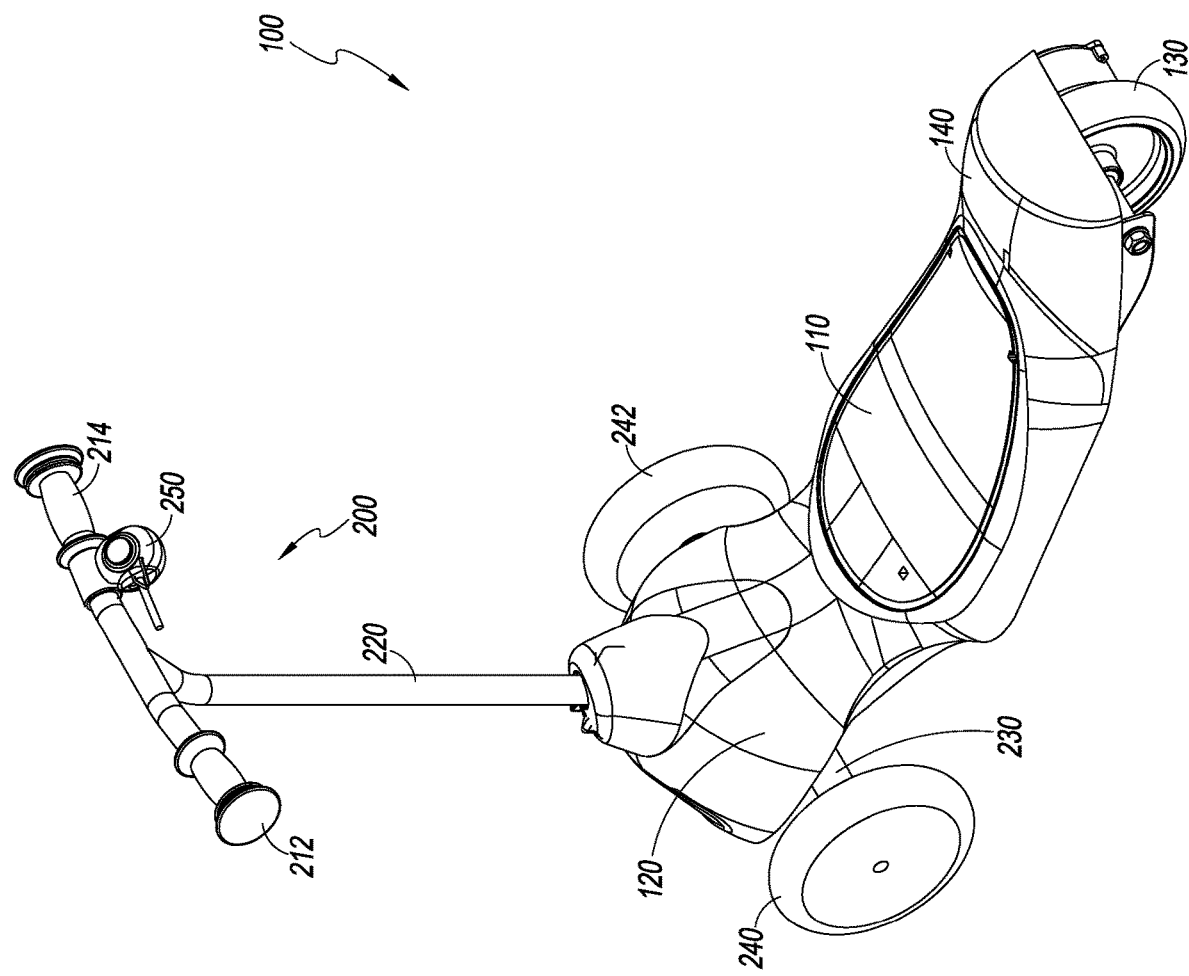
FIG. 12 is another perspective view of the scooter assembly of Figure
Figure 13:
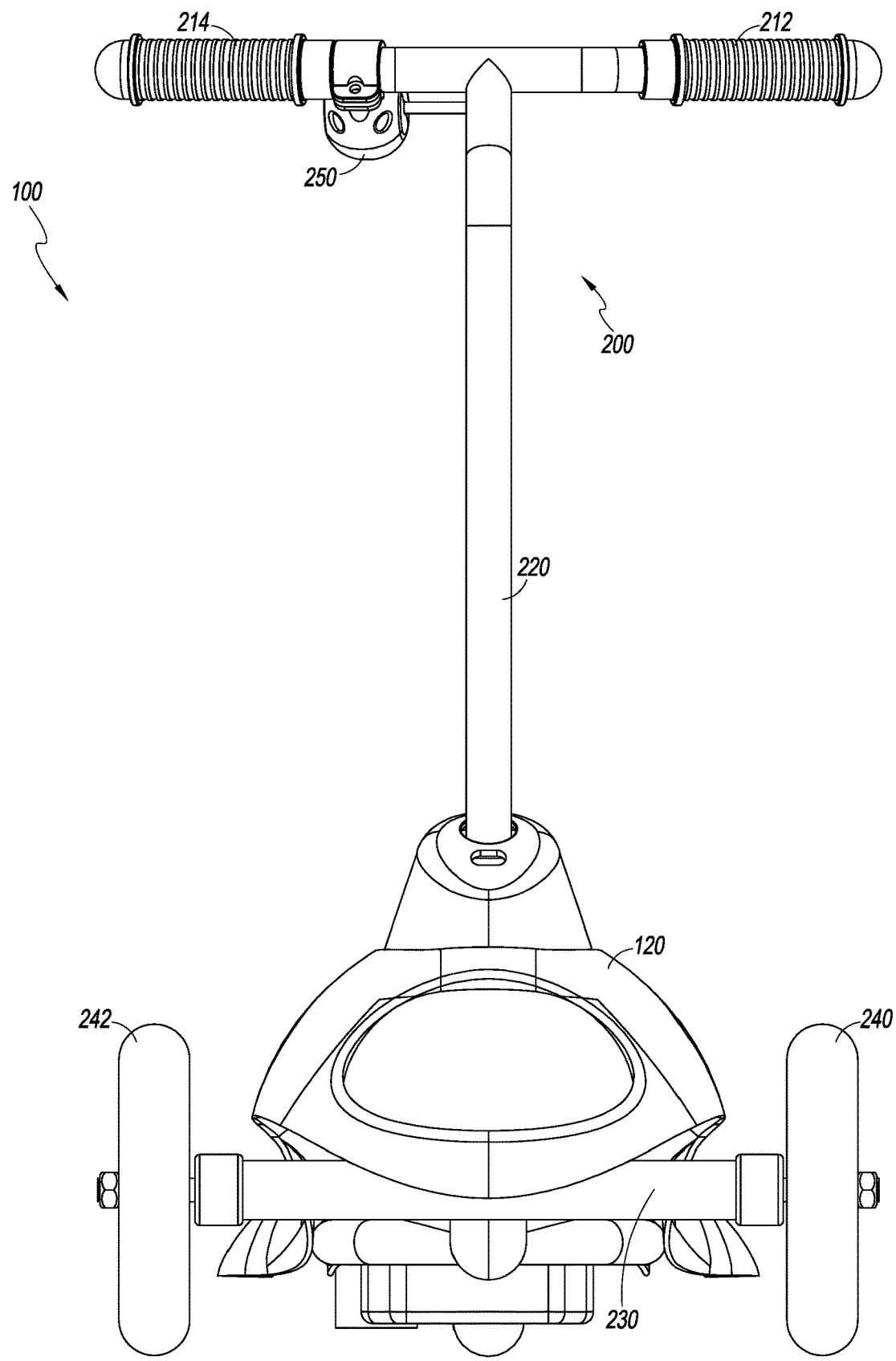
FIG. 13 is a front elevational view of the scooter assembly of FIG. 11.
Figure 14:
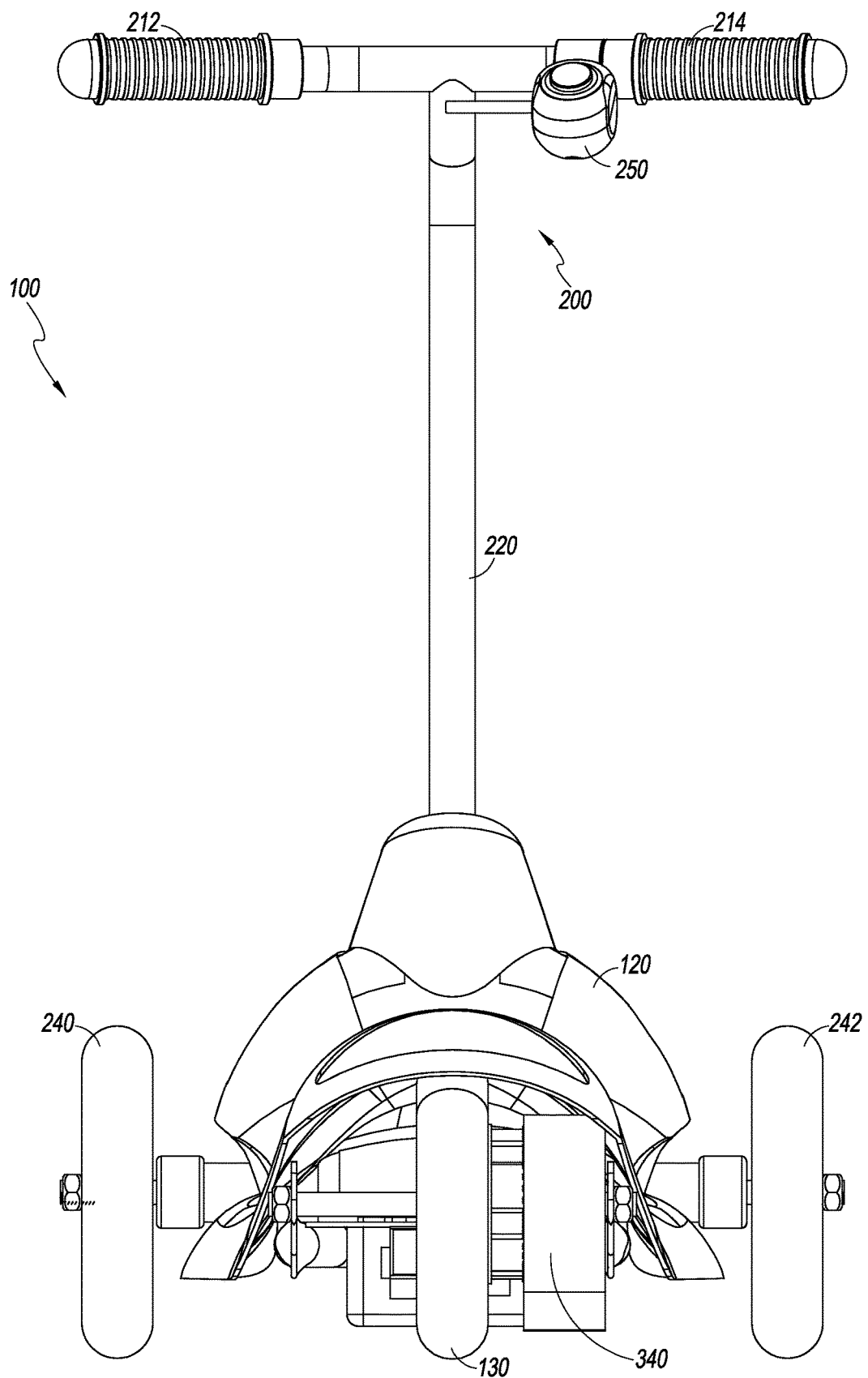
FIG. 14 is a rear elevational view of the scooter assembly of FIG. 11.
Figure 15:
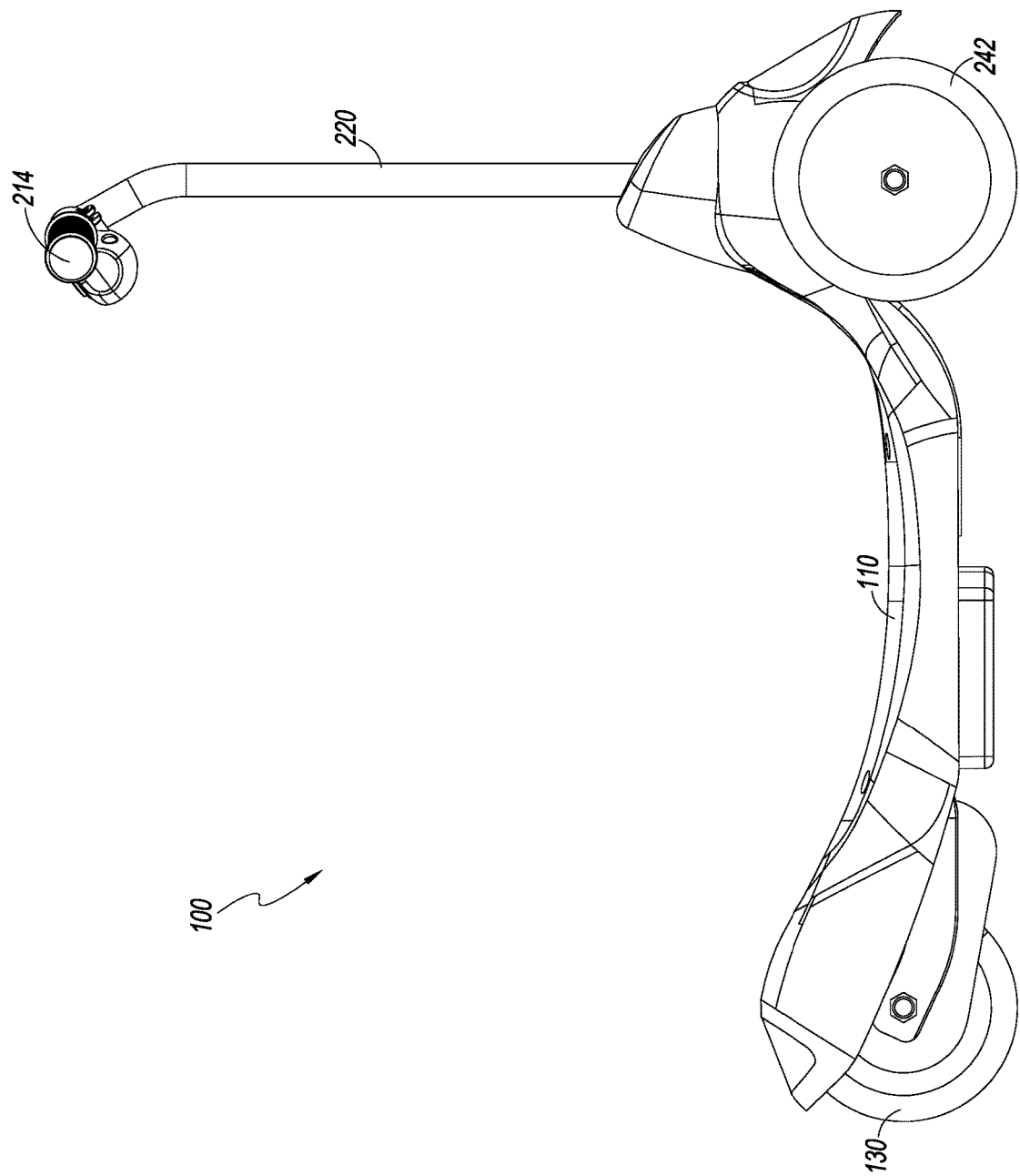
FIG. 15 is a right side elevational view of the scooter assembly of FIG. 11.
Figure 16:
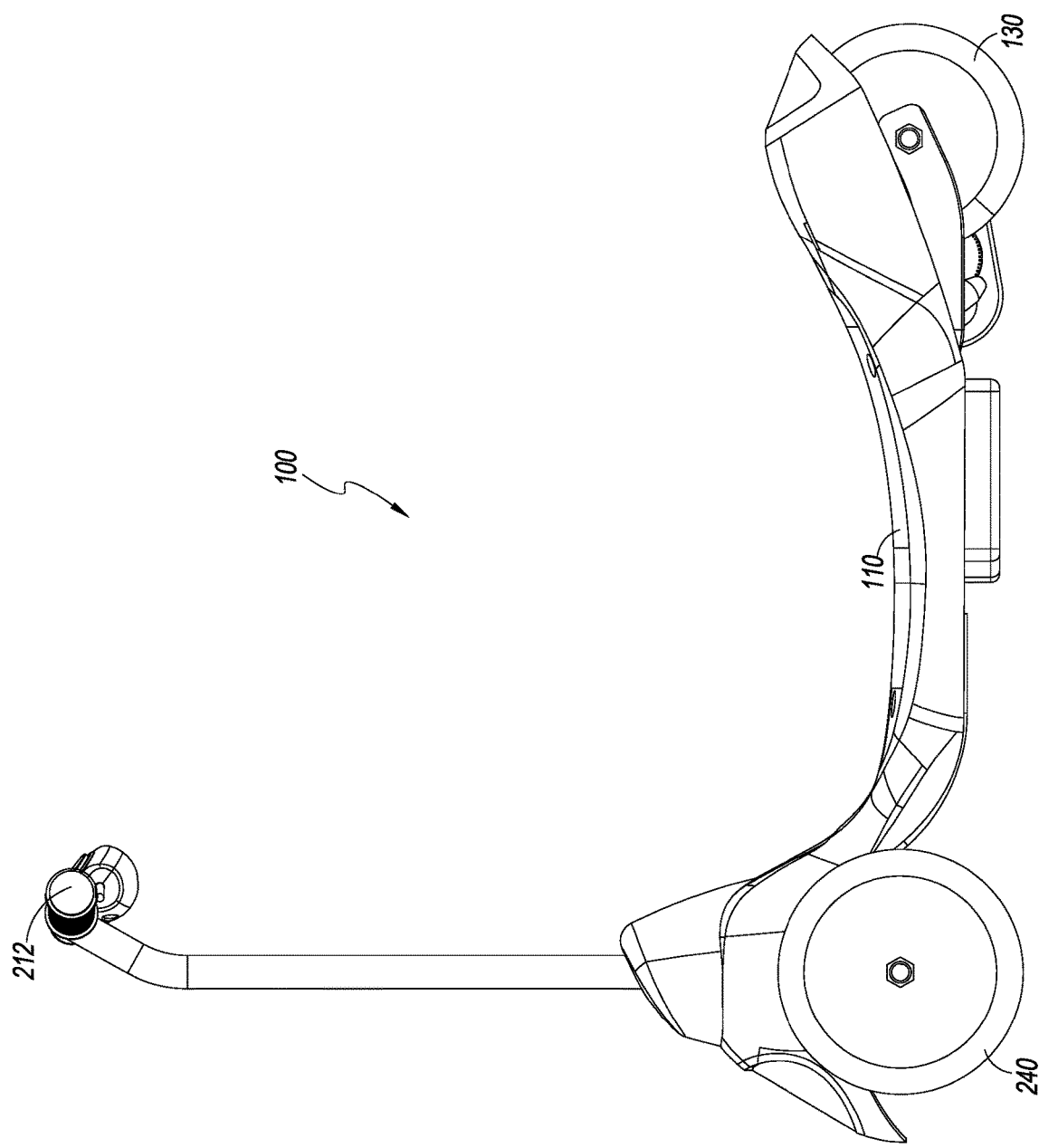
FIG. 16 is a left side elevational view of the scooter assembly of FIG. 11.
Figure 17:
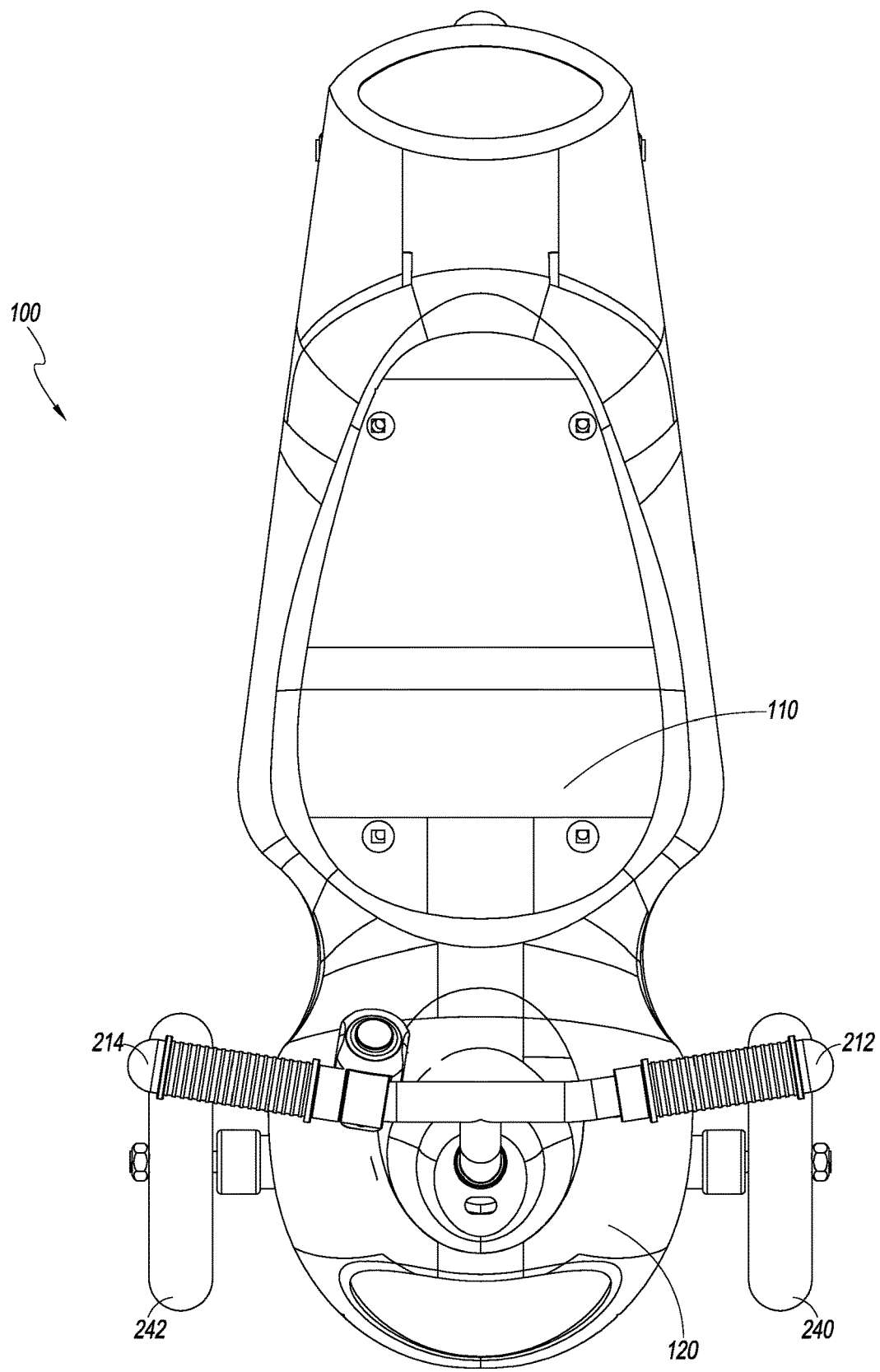
FIG. 17 is a top plan view of the scooter assembly of FIG. 11.

FIG. 10 illustrates an embodiment of an electric motor and transmission system that can be positioned underneath the deck of a scooter assembly. The electric motor and transmission system can generally comprise an electric motor 400 and a solid-gear transmission 300 enclosed in a casing 340. The solid-gear transmission 300 can transfer mechanical power output from the electric motor 400 to the rear wheel 130 of a scooter assembly. In some embodiments, the rear wheel 130 and the electric motor 400 can both be located on a same side relative to the transmission 300. For example, as illustrated in FIG. 10, if the electric motor 400 is oriented towards the front of a scooter assembly, the electric motor 400 can be located on a right side relative to the transmission 300. The rear wheel 130 of a scooter assembly can be positioned on the same side as the electric motor 400 relative to the transmission 300. For example, as illustrated in FIG. 10, if the electric motor 400 is oriented towards the front of a scooter assembly, the rear wheel 130 also can be located on the right side relative to the transmission 300. The relative positioning of the electric motor 400 and rear wheel 130 relative to the transmission 300 can be used to improve the weight distribution of the scooter assembly, which can result in a smoother and more stable ride. Internal components or portions otherwise not shown can be similar to other components or portions described herein or of another suitable arrangement. An associated scooter can include a power source (e.g., a battery) that provides power to the electric motor 400 illustrated in FIG. 10.

FIGS. 11-18 illustrate an embodiment of a scooter 100, which can be the same as or similar to the previous scooter 100. The scooter 100 can generally comprise a deck 110, a neck portion 120, a rear wheel 130, and a steering assembly 200. The deck 110 is a component of the scooter 100 on which a rider can stand during use. For example, the deck 110 can be configured to support the weight of at least a child. In other embodiments, the deck 110 can be configured to support the weight of an adolescent or adult. In some embodiments, the scooter 100 can include an electric motor and a transmission.

The neck portion 120 can be joined to the deck 110 at or near a front end of the deck 110. The neck portion 120 can serve to couple the deck 110 and the steering assembly 200. In some embodiments, the neck portion 120 can be integrally formed with the deck 110 such that the deck 110 and neck portion 120 are a single machined or molded component or a unitary structure formed by any suitable process.

The steering assembly 200 generally can comprise a handlebar 210, steering tube 220, rotating axle assembly 230, left front wheel 240, and right front wheel 242. The steering tube 220 can be coupled to and extend through the neck portion 120. The deck 110, neck portion 120, and steering assembly 200 can be formed from various materials, including any combination of metals, plastic, carbon fiber, and/or other materials that impart sufficient structural strength to support the weight of at least a child. At a top portion of the steering tube 220 a handlebar 210 can be attached. The handlebar 210 can comprise a left handle 212 and a right handle 214 for the rider to grip and steer the scooter. Turning the handlebar 210 can cause the steering tube 220 to turn the front left and right wheels 240 and 242.

In addition, the handlebar 210 can comprise a user control or power switch 250. A user can activate the power switch 250 to turn on an electric motor. The switch 250 can be a binary switch or control. In other arrangements, the user control can be a variable control. A control wire can electrically couple the power switch 250 with a voltage controller, which may be coupled to a battery and to the electric motor. In some embodiments, the control wire can be hidden from view, as shown in FIG. 3, at least when the scooter 100 is resting on a generally flat surface in a normal use condition.

A steering assembly 200 can comprise a handlebar 210, steering tube 220, rotating axle assembly 230, left front wheel 240, and right front wheel 242. The steering tube 220 can be coupled to the neck portion 120. In addition, the steering tube 220 can extend through the neck portion 120 to the rotating axle assembly 230. The rotating axle assembly 230 can be coupled to the front left and right wheels 240 and 242. At or near a top portion of the steering tube 220, a handlebar 210 can be attached. The handlebar 210 can comprise a left handle 212 and a right handle 214 for the rider to grip and steer the scooter. Turning the handlebar 210 can cause the steering tube 220 to turn the front left and right wheels 240 and 242. In some embodiments, power from an electric motor is not supplied to the front left and right wheels 240 and 242, as front left and right wheels 240 and 242 are primarily used for steering.

Figure 18:
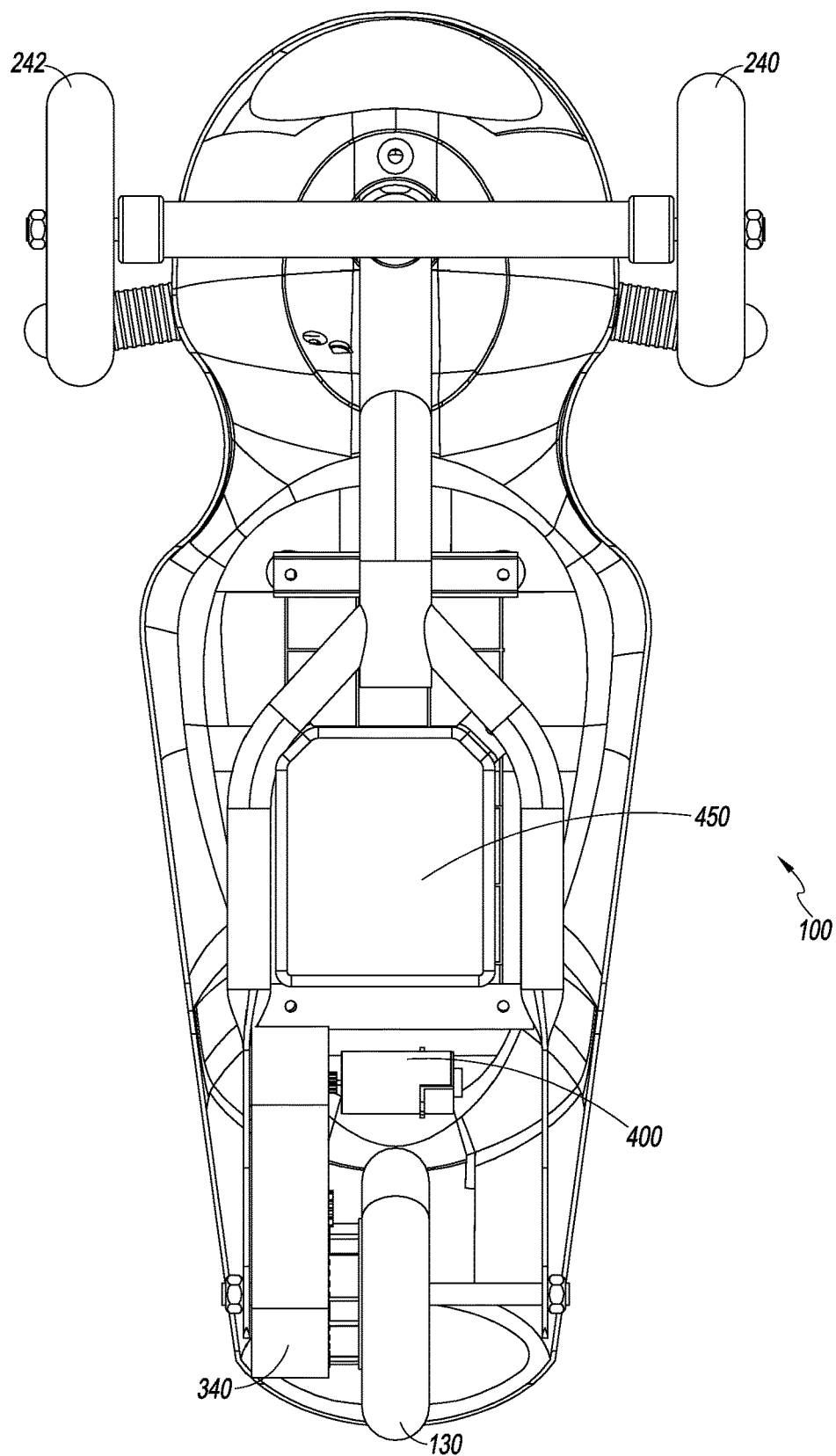
FIG. 18 is a bottom plan view of the scooter assembly of FIG. 11.
Figure 19A:
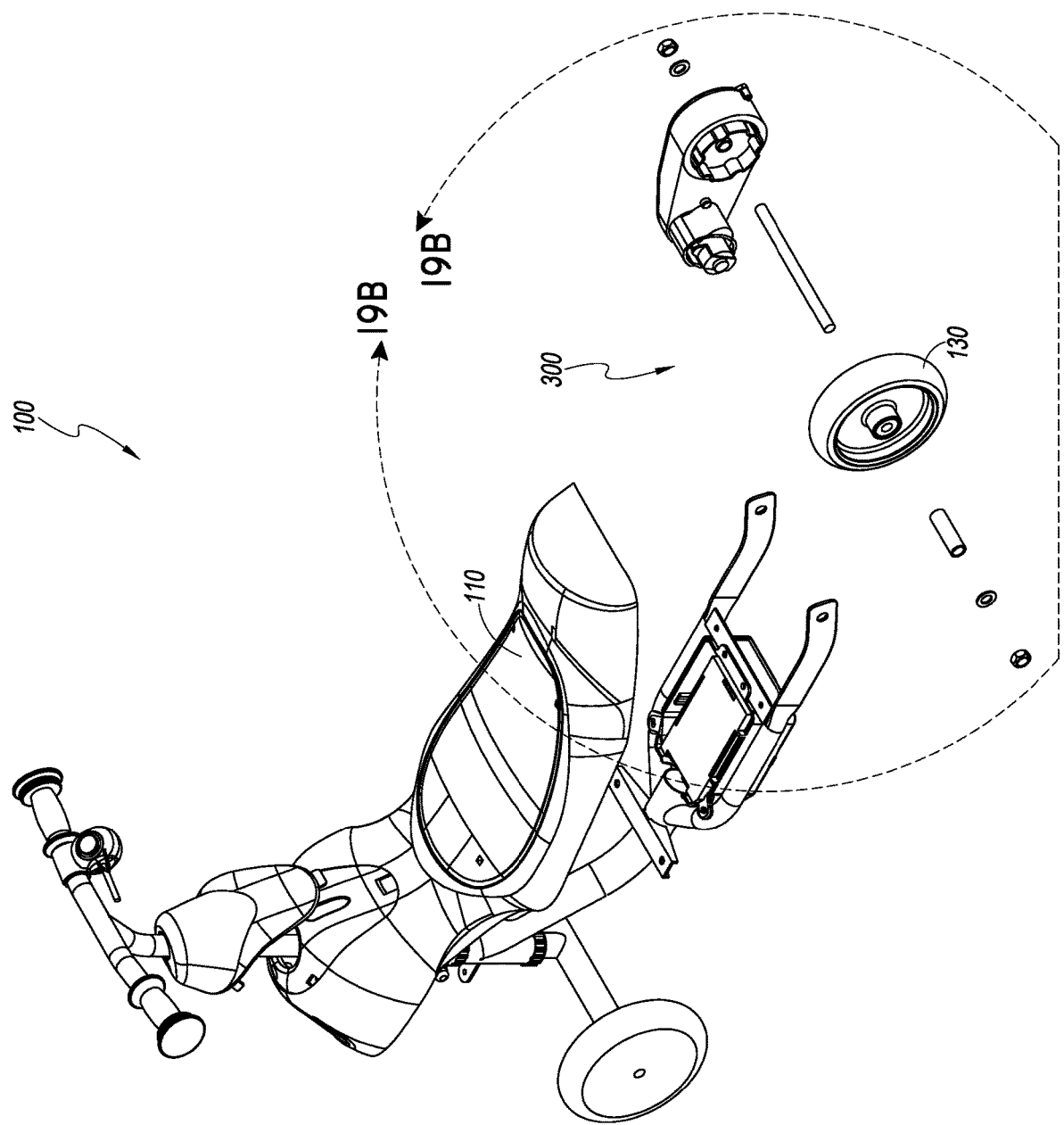
FIG. 19A is a perspective view illustrating an exploded portion of the scooter assembly of FIG. 11.

FIG. 19A is a perspective view illustrating an exploded portion of the scooter assembly of FIGS. 11-18. For example, the exploded portion generally illustrates an embodiment of an electric motor 400 and transmission system 300 that can be positioned underneath the deck 110 of a scooter assembly 100 and which transfers power to rear wheel 130.

Figure 19B:
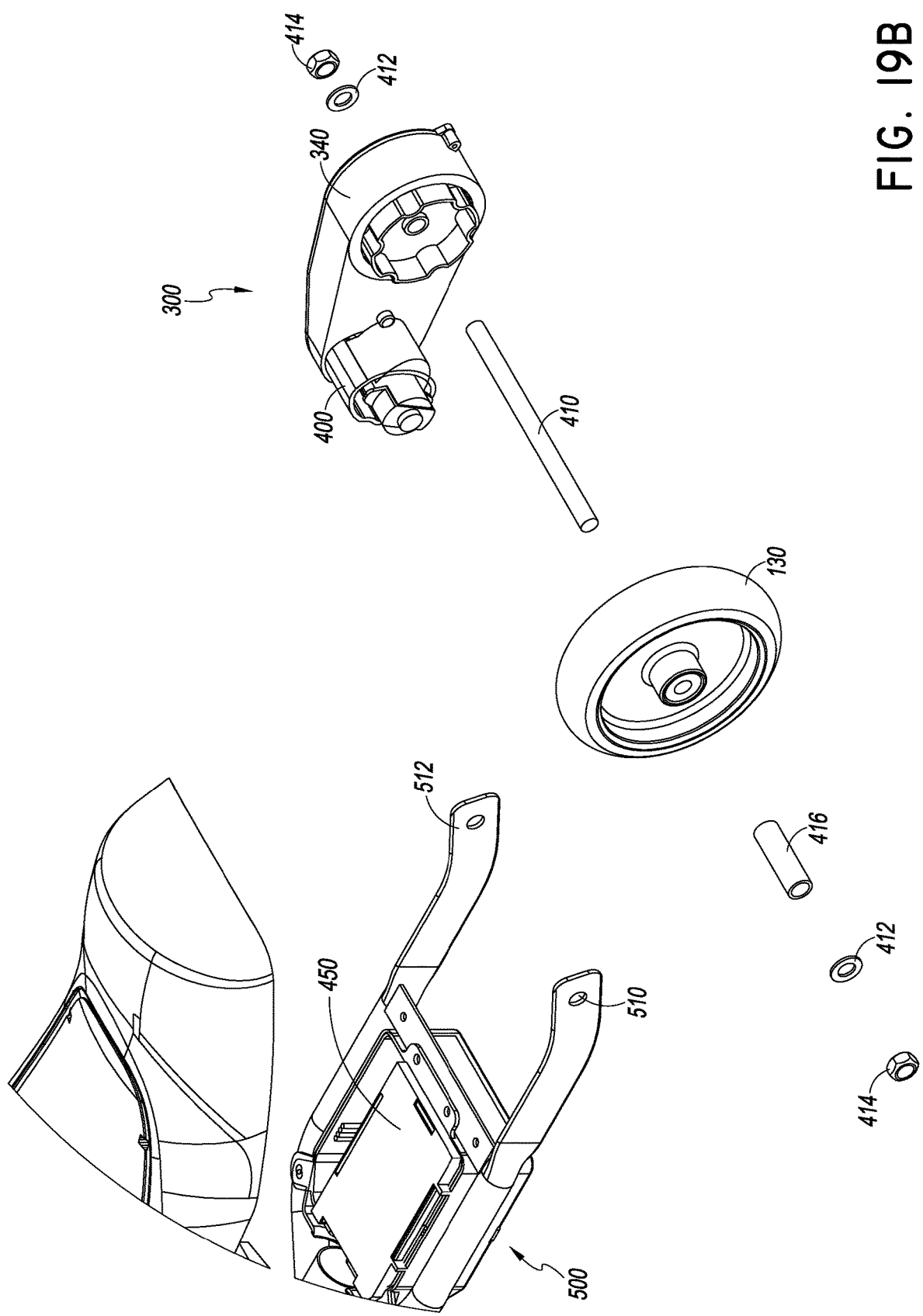
FIG. 19B illustrates the exploded portion of the scooter assembly of FIG. 19A.

FIG. 19B illustrates the exploded portion of the electric motor and transmission system of the scooter assembly of FIG. 19A. In particular, the electric motor and transmission system can generally comprise an electric motor 400 and a solid-gear transmission 300. In some embodiments, the solid-gear transmission 300 may comprise a first gear 310, a second gear 320, and a third gear 330, as illustrated in FIGS. 5-8. The solid-gear transmission 300 can transfer mechanical power output from the electric motor 400 to the rear wheel 130 of the scooter assembly through the axle 410. For example, when mechanical power is provided to the axle 410, it can cause the rear wheel 130 to rotate. In some embodiments, the power output of the electric motor is controlled by a controller, as explained in more detail with respect to FIGS. 21 and 22A-B. In addition, a casing 340 may be used to house the transmission system 300.

With additional reference to FIG. 18, for example, the illustrated scooter 100 includes the rear wheel 130 positioned along a center line or central, vertical plane of the scooter 100. The transmission casing 340 containing the transmission is positioned to one side of the rear wheel 130, such as on the right side of the scooter 100 (left side in the bottom view of FIG. 18). The motor 400 is on the same side of the transmission casing 340 as the rear wheel 130. The motor 400 preferably is coupled to and supported by the transmission casing 340. The transmission casing 340 can be a separate assembly from the frame 500 and coupled to the frame 500. The center line or central plane passes through the motor 400. In the illustrated arrangement, the motor 400 is centered in a lateral direction of the scooter 100 and positioned forward of the rear wheel 130. In some configurations, the power source (e.g., battery 450) is positioned forward of the motor 400, such that the motor 400 is between the battery 450 and the rear wheel 130 in a lengthwise direction of the scooter 100.

The scooter assembly 100 may include a frame 500 that supports the deck A rear portion of the frame 500 may include openings 510 and 512 to facilitate attachment of the electric motor and transmission system to the scooter assembly. For example, a nut 414 and washer 412 may be used to couple the axle 410 with transmission 300 and secured to the frame 500 through opening 512. Another nut 414 and washer 412 may be used to couple the axle 410 with the rear wheel 130 through opening 510. A spacer 416 may be provided surrounding the axle 410 to control a position of the rear wheel 130. The battery 450 can be surrounded on front, rear, left and right sides by frame members to ease mounting, provide protection or improve the appearance of the scooter. The battery 450 can be housed in a compartment or housing with other components, such as a controller (e.g., controller 600), for example.

Figure 20A:
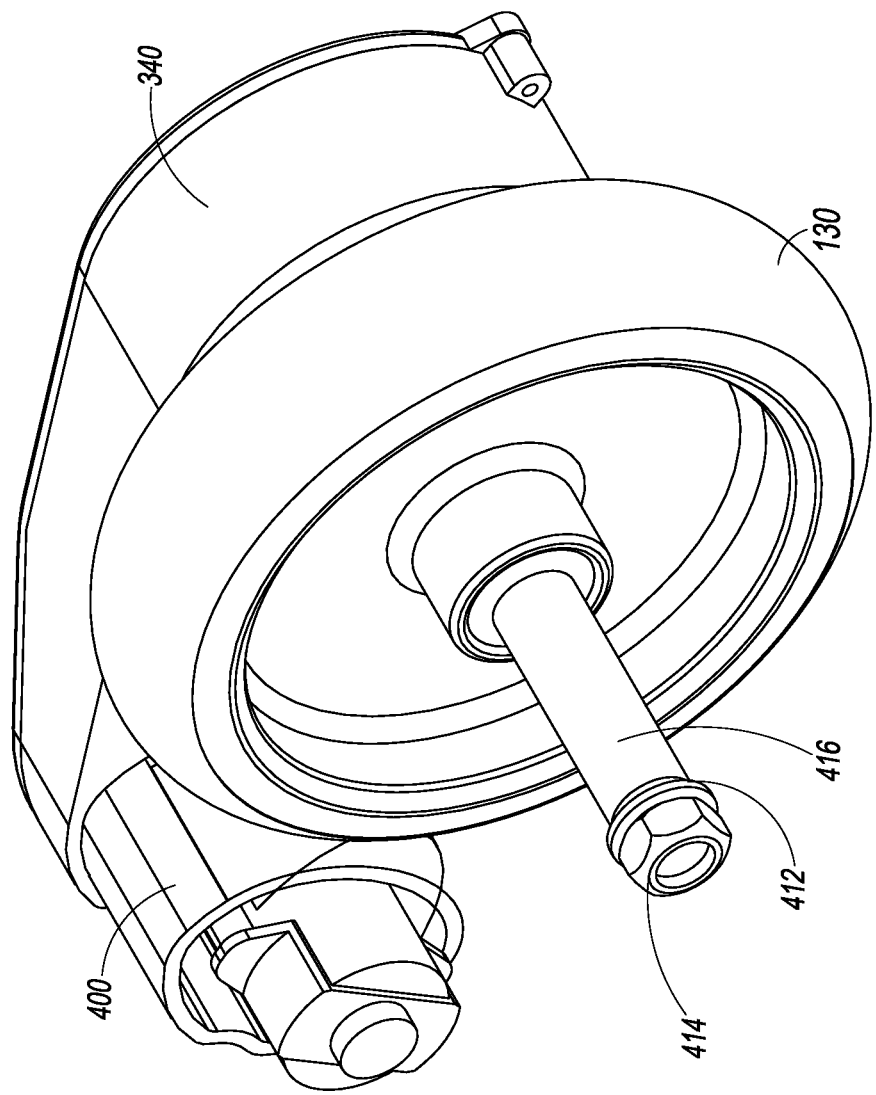
FIG. 20A illustrates a perspective view of an embodiment of an electric motor and transmission system for a scooter assembly.
Figure 20B:
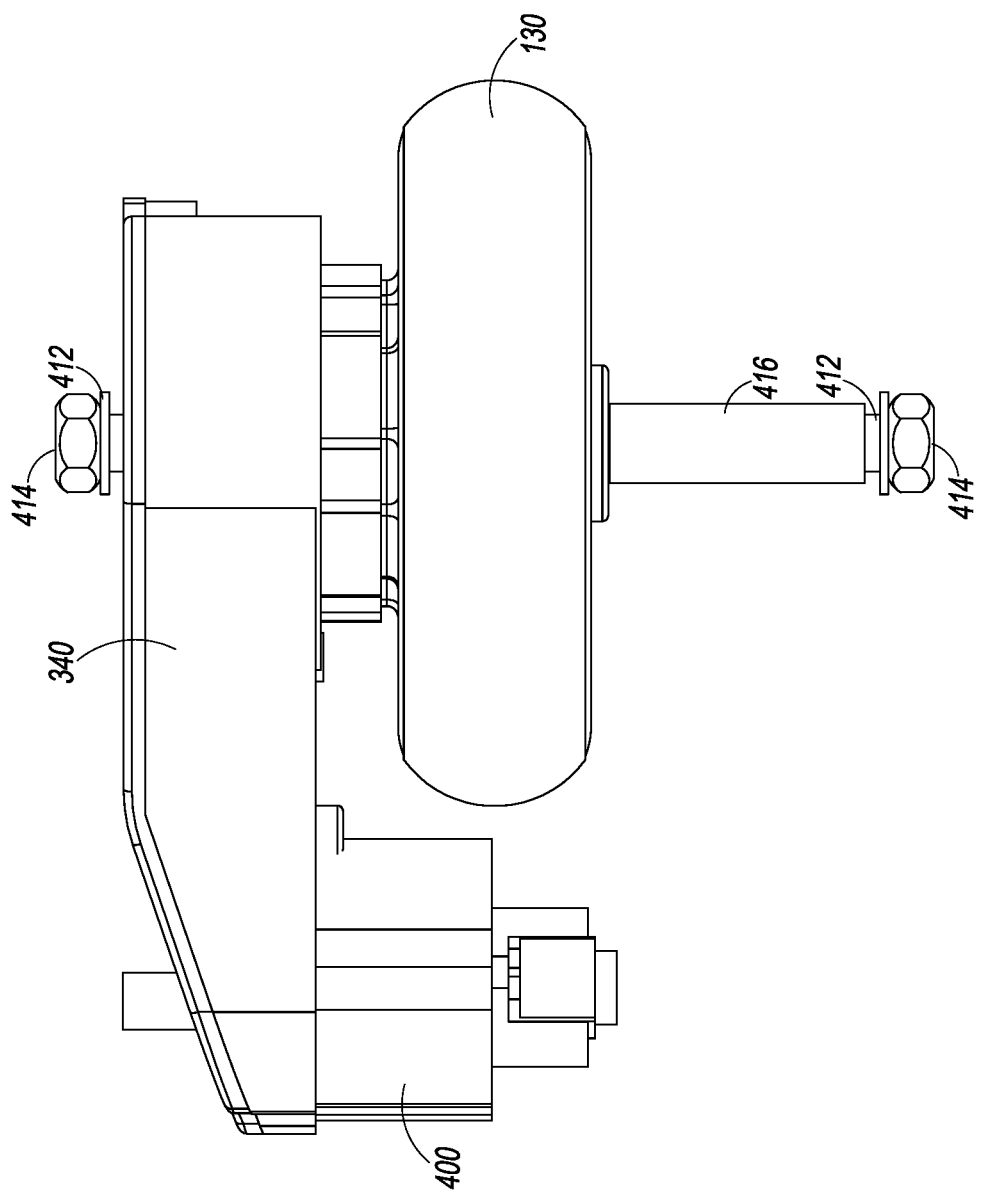
FIG. 20B illustrates a top plan view of the electric motor and transmission system of FIG. 20A.
Figure 20C:
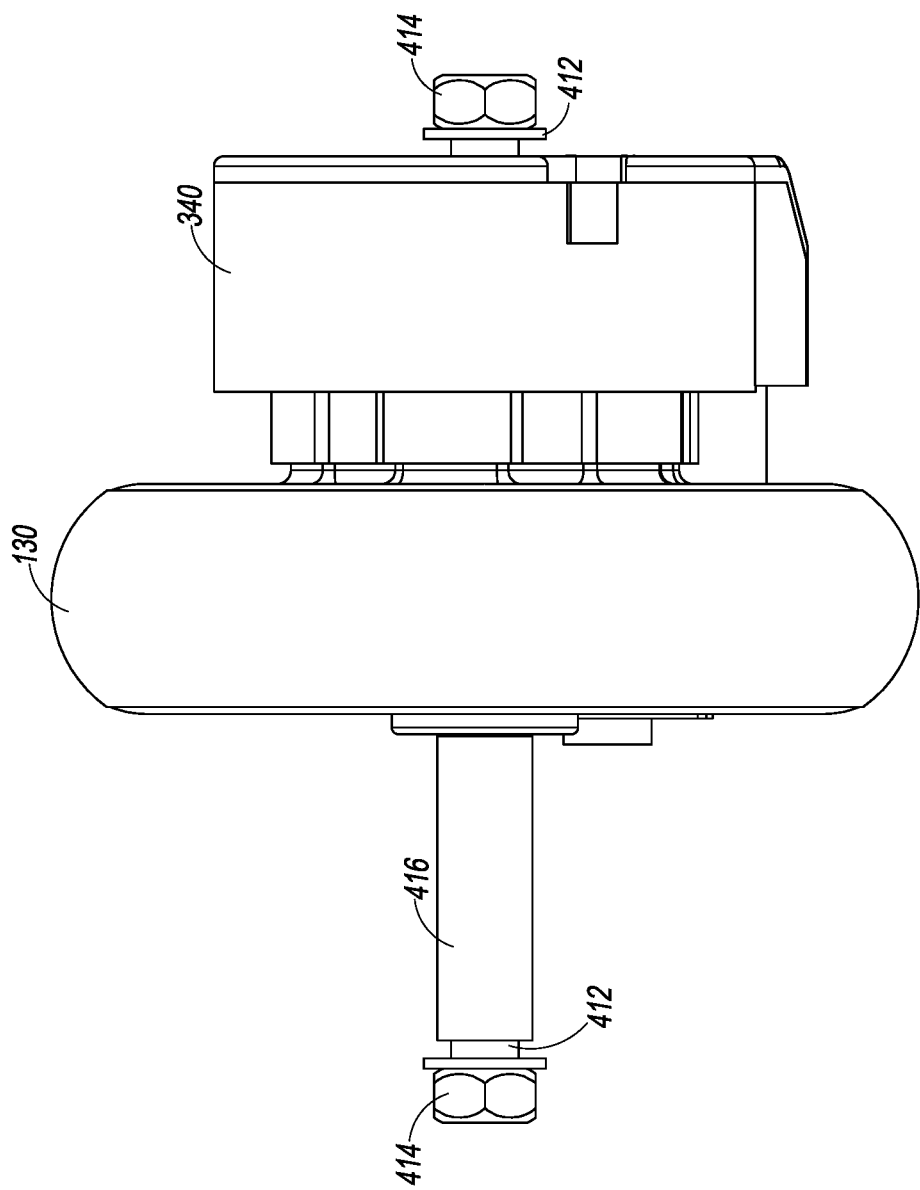
FIG. 20C illustrates a rear elevational view of the electric motor and transmission system of FIG. 20A.

FIG. 20A illustrates a perspective view of an embodiment of an electric motor 400 and transmission system casing 340 for a scooter assembly. FIG. 20B illustrates a top plan view of the electric motor 400 and transmission system casing 340 of FIG. 20A. FIG. 20C illustrates a rear elevational view of the electric motor 400 and transmission system casing 340 of FIG. 20A. An axle (not shown) may couple the transmission system to the rear wheel 130. A spacer 416 may be provided surrounding the axle to control a position of the rear wheel 130. A nut 414 and washer 412 may be provided at each end of the axle.

In some embodiments, the electric motor 400 can be positioned approximately in line with the rear wheel 130, as shown in FIG. 20B. The transmission system and casing 430 can be provided on a right side relative to both the rear wheel 130 and the electric motor 400. By providing the electric motor 400 approximately in line with the rear wheel 130 facilitates the ability of the rear wheel 130 to support the weight of the electric motor 400, thereby providing improved weight distribution.

Figure 21:
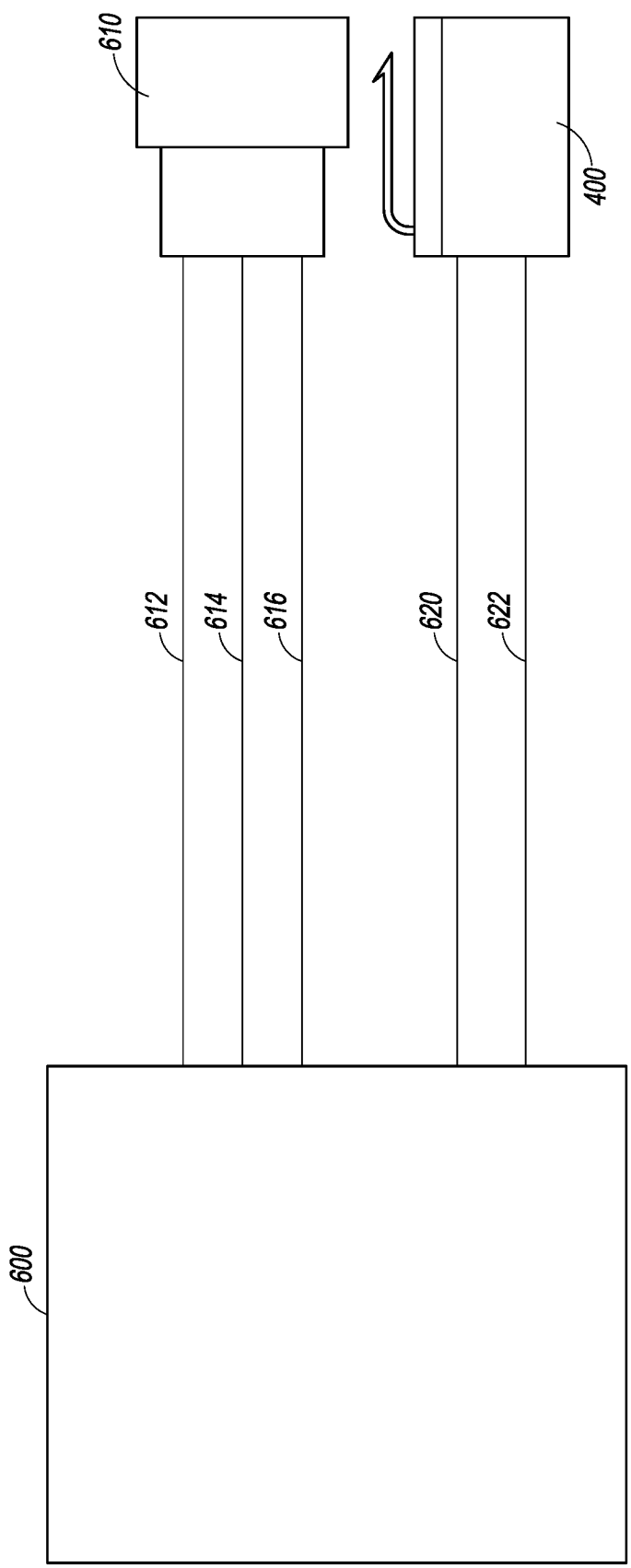
FIG. 21 illustrates a block diagram of an embodiment of a controller for an electric motor and transmission for a scooter assembly.

FIG. 21 illustrates a block diagram of an embodiment of a controller 600 for an electric motor and transmission for a scooter assembly. The controller 600 may be coupled to a power switch 250 of a scooter assembly 100, a battery 610, and an electric motor 400. The battery 400 may provide electric power to the controller 600 through wires 614 and 616. In particular, in some embodiments, wire 614 may deliver positive voltage to the controller 600 (e.g., a red wire). Wire 616 may serve as a ground (e.g., a black wire). In addition, wire 612 may serve any other function. Wires 620 and 622 may deliver electric power from the controller 600 to the electric motor 400. For example, in some embodiments, wire 620 may deliver positive voltage to the electric motor 400, whereas wire 622 may serve as a ground.

In some embodiments, the scooter assembly has a predetermined maximum speed. The predetermined maximum speed may be set based on the safety considerations of a child. When a rider presses a power switch 250, an 'on' signal may be provided to the controller 600, and the controller 600 may control the voltage delivered to the electric motor 400 as the scooter assembly accelerates from a rest position toward or to its predetermined maximum speed.

Figure 22B:
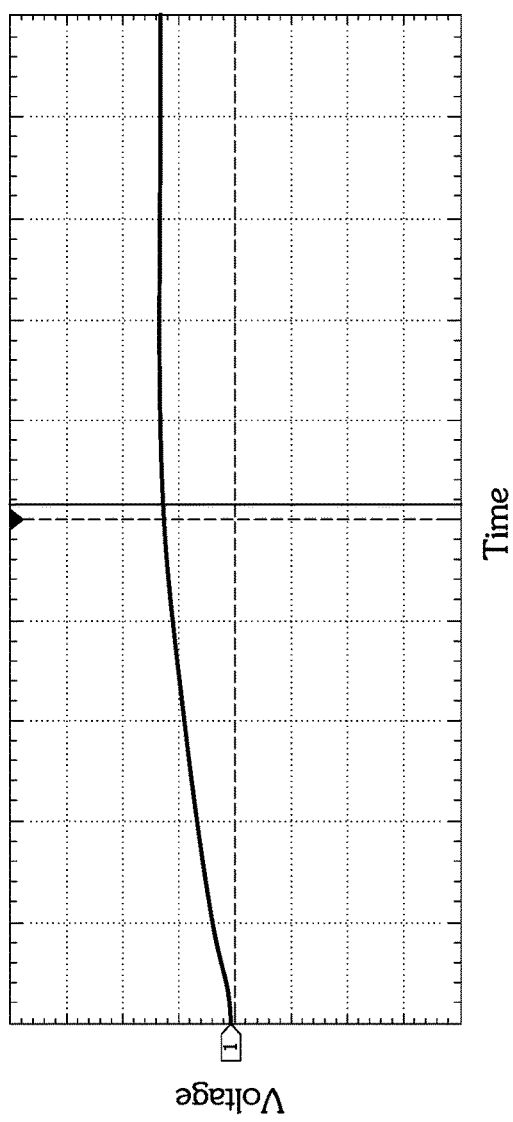
FIG. 22B illustrates a graph showing an example of a starting voltage applied to an electric motor of a scooter assembly with a voltage controller.
Figure 22A:
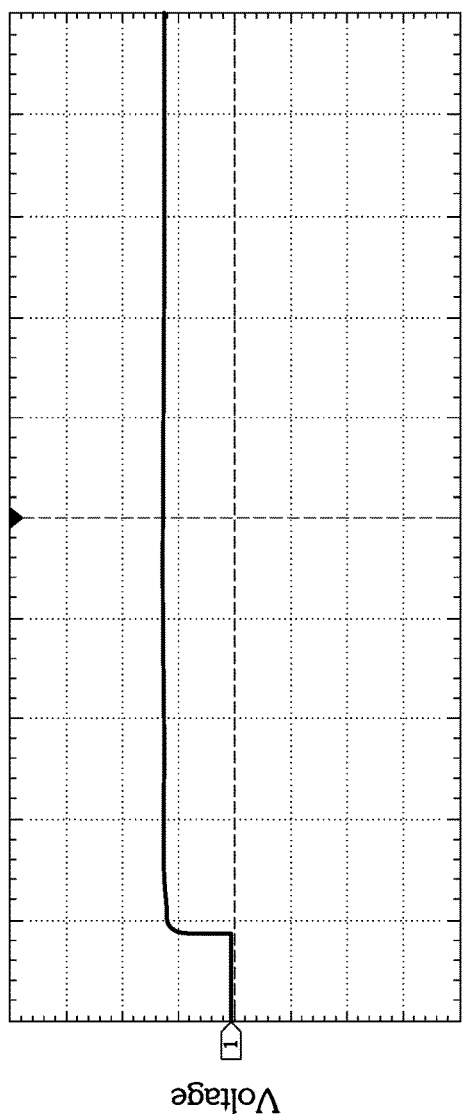
FIG. 22A illustrates a graph showing an example of a starting voltage applied to an electric motor of a scooter assembly without a voltage controller.

FIG. 22A illustrates a graph showing an example of a starting voltage applied to an electric motor of a scooter assembly without a voltage controller. For example, without the controller 600, as soon as a rider presses the power switch 250, the electric motor is nearly-instantaneously provided with the voltage that causes the scooter assembly to accelerate to the maximum predetermined speed. This voltage spike could result in a jerking motion applied to a rider of the associated scooter.

FIG. 22B illustrates a graph showing an example of a starting voltage applied to an electric motor of a scooter assembly with a voltage controller according to an embodiment. For example, with the controller 600, when a rider presses the power switch 250, the controller 600 smoothly ramps up the voltage provided to the electric motor 400. For example, in some embodiments, as shown in FIG. 22B, the voltage controller ramps the voltage provided to the electric motor 400 from zero up to its maximum predetermined speed smoothly over an interval of approximately two seconds or at least two seconds. In contrast, the arrangement of FIG. 22A reaches maximum voltage in about $1/25$ or less of the amount of time it takes the arrangement of FIG. 22B to reach maximum voltage. In other configurations, the scooter with the illustrated control arrangement can accelerate from zero to its maximum speed over an interval of at least one second or an interval of between about 1-3 seconds or about 1-2 seconds, for example and without limitation.

In some embodiments, the controller 600 provides a safe-start method of control. In particular, after a rider presses the power switch 250, the power transferred from the battery 610 to the electric motor 400 may be initially limited by the controller 600 to a predetermined fraction of the full power for a pre-specified amount of time, after which the controller 600 allows the power transferred from the battery 610 to the electric motor 400 to ramp up to the maximum power. For example, this safe-start method allows young riders to become aware of the forward motion of the scooter assembly before experiencing the full forward motion of the scooter, and without having to experience 100% of the forward motion as a sudden, single acceleration event. In some configurations, the power transferred immediately ramps up from the initiation of the power switch 250 or other user control.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. An electric scooter comprising:
   at least one front wheel;
   at least one rear wheel;
   a steering assembly comprising a handlebar and a steering tube;
   a deck configured to support the weight of a human;
   an electric motor configured to provide power;
   a transmission configured to transfer power provided by the electric motor to at least one of the at least one front wheel and the at least one rear wheel;
   a battery; and
   a controller operatively coupled to the battery and the electric motor, wherein, in response to receiving an on-signal, the controller is configured to ramp up a voltage provided to the electric motor over an interval of time, wherein the interval of time is at least one second.

2. The scooter of claim 1, wherein the electric motor is located approximately in line with the at least one rear wheel in a lateral direction of the scooter.

3. The scooter of claim 2, wherein the electric motor is positioned between the battery and the at least one rear wheel in a lengthwise direction of the scooter.

4. The scooter of claim 3, wherein the battery is surrounded by frame members on at least one side of the battery.

5. The scooter of claim 1, wherein the interval of time is at least two seconds.

6. The scooter of claim 1, further comprising a switch operatively coupled to the controller to provide the on-signal to the controller.

7. The scooter of claim 1, wherein the power switch comprises a binary switch.

8. The scooter of claim 1, wherein the controller, upon receipt receiving an on-signal, is configured to initially limit a voltage provided by the electric motor to a predetermined fraction of the full power for a pre-specified amount of time.

9. An electric scooter comprising:
   at least two wheels
   a steering assembly;
   a deck;
   an electric motor configured to provide power to the at least two wheels;
   a battery;
   a controller operatively coupled to the battery and the electric motor, wherein, in response to receiving an on-signal, the controller is configured to ramp up a voltage provided to the electric motor over an interval of time, wherein the interval of time is at least one second.

10. The scooter of claim 9, wherein the electric motor is located approximately in line with the at least one rear wheel in a lateral direction of the scooter.

11. The scooter of claim 9, wherein the interval of time is at least two seconds.

12. The scooter of claim 9, further comprising a switch operatively coupled to the controller to provide the on-signal to the controller.

13. The scooter of claim 9, wherein the power switch comprises a binary switch.

14. The scooter of claim 9, wherein the controller, upon receipt receiving an on-signal, is configured to initially limit a voltage provided by the electric motor to a predetermined fraction of the full power for a pre-specified amount of time.

* * * * *